(12) United States Patent
Bayar et al.

(10) Patent No.: US 12,126,678 B2
(45) Date of Patent: Oct. 22, 2024

(54) MODULAR ELECTRONIC APPARATUS FOR DISTRIBUTION OF SATELLITE SIGNALS

(71) Applicant: ETL SYSTEMS LIMITED, Hereford (GB)

(72) Inventors: Esen Bayar, Northwood (GB); Sebastien Francis Butstraen, Watford (GB); Simon Richard Swift, Kilcot (GB)

(73) Assignee: ETL SYSTEMS LIMITED, Hereford (GB)

( * ) Notice: Subject to any disclaimer, the term of this patent is extended or adjusted under 35 U.S.C. 154(b) by 0 days.

(21) Appl. No.: 18/279,190

(22) PCT Filed: Feb. 28, 2022

(86) PCT No.: PCT/EP2022/055019
§ 371 (c)(1),
(2) Date: Aug. 28, 2023

(87) PCT Pub. No.: WO2022/184658
PCT Pub. Date: Sep. 9, 2022

(65) Prior Publication Data
US 2024/0037050 A1  Feb. 1, 2024

(30) Foreign Application Priority Data
Mar. 1, 2021  (GB) .................................. 2102877

(51) Int. Cl.
*H04L 67/1074* (2022.01)
*G06F 13/364* (2006.01)
*H04Q 1/02* (2006.01)

(52) U.S. Cl.
CPC ........ *H04L 67/1074* (2013.01); *G06F 13/364* (2013.01); *H04Q 1/136* (2013.01); *H04Q 2201/04* (2013.01); *H04Q 2201/10* (2013.01)

(58) Field of Classification Search
CPC .. G06F 13/364; H04Q 1/136; H04Q 2201/04; H04Q 2201/10
(Continued)

(56) References Cited

U.S. PATENT DOCUMENTS 6,222,908 B1 * 4/2001 Bartolutti ............... H04Q 1/136
379/27.01
6,424,710 B1 * 7/2002 Bartolutti ............... H04Q 1/136
379/326
(Continued)

FOREIGN PATENT DOCUMENTS

EP   3482570 A0   5/2019
GB   2604345 B    3/2023
(Continued)

OTHER PUBLICATIONS

Combined Search and Examination Report for GB 2102877.4 (now GB 2604345), mailed on Sep. 3, 2021. 7 pages.
(Continued)

*Primary Examiner* — Tauqir Hussain
(74) *Attorney, Agent, or Firm* — Kipman Tyler Werking; Frontier IP Law PLLC

(57) ABSTRACT

The application relates to modular electronic apparatus (1) for distribution of RF communication signals. The apparatus comprises a chassis (2) arranged to removably receive plural modules (3), at least some of which are arranged to receive and process RF communication signals. A communication path (17) is provided for modules to communicate with each other and/or with the chassis. Plural modules received in the chassis. When a module is received in the chassis, it is arranged to broadcast a message over the communication path indicating its presence in the chassis and its type. At least one other module is arranged to adapt its behaviour in response to the message.

7 Claims, 15 Drawing Sheets

(58) Field of Classification Search
USPC .......................................................... 710/110
See application file for complete search history.

(56) References Cited

U.S. PATENT DOCUMENTS

| | | | | |
|---|---|---|---|---|
| 6,784,802 | B1* | 8/2004 | Stanescu | G06K 19/07758 340/687 |
| 6,968,994 | B1* | 11/2005 | Ashwood Smith | G01R 31/60 235/487 |
| 10,395,219 | B1* | 8/2019 | Mentz | G06F 9/45558 |
| 10,691,986 | B2* | 6/2020 | Rodriguez | G06V 30/422 |
| 10,733,328 | B1* | 8/2020 | Perkins | G06F 21/86 |
| 10,785,294 | B1* | 9/2020 | Andersen | G06F 3/065 |
| 10,805,264 | B2* | 10/2020 | Ryan | H04L 41/12 |
| 10,891,451 | B2* | 1/2021 | Hochhalter | G06Q 10/08 |
| 10,965,068 | B1* | 3/2021 | King | H05B 47/19 |
| 10,996,645 | B1* | 5/2021 | King | H02J 3/14 |
| 11,188,214 | B2* | 11/2021 | VanGilder | G06F 30/13 |
| 11,201,444 | B1* | 12/2021 | King | H04L 12/10 |
| 11,264,769 | B1* | 3/2022 | King | H01R 33/945 |
| 11,403,127 | B2* | 8/2022 | Bryant | G06F 9/45558 |
| 11,460,874 | B1* | 10/2022 | King | G05F 1/625 |
| 2003/0221817 | A1* | 12/2003 | Smith | G06F 1/20 174/16.3 |
| 2003/0223196 | A1* | 12/2003 | Smith | H05K 7/1488 361/679.48 |
| 2003/0223199 | A1* | 12/2003 | Smith | G06F 1/181 312/223.1 |
| 2003/0224645 | A1* | 12/2003 | Smith | G06F 1/20 307/11 |
| 2004/0057202 | A1* | 3/2004 | Rabinovitz | G11B 33/128 |
| 2004/0057203 | A1* | 3/2004 | Rabinovitz | G06F 1/184 |
| 2004/0100775 | A1* | 5/2004 | Baker | G11B 33/128 |
| 2005/0129035 | A1* | 6/2005 | Saito | H04L 41/50 370/401 |
| 2007/0058657 | A1* | 3/2007 | Holt | H04L 41/28 370/438 |
| 2008/0212273 | A1* | 9/2008 | Bechtolsheim | G06F 1/183 361/679.48 |
| 2009/0166404 | A1* | 7/2009 | German | G02B 6/3895 235/375 |
| 2011/0090633 | A1* | 4/2011 | Rabinovitz | G06F 1/184 361/679.31 |
| 2012/0005344 | A1* | 1/2012 | Kolin | H05K 7/20836 715/733 |
| 2014/0008370 | A1* | 1/2014 | Judd | H05K 7/14 220/500 |
| 2014/0108692 | A1* | 4/2014 | Doglio | H05K 7/1489 361/679.02 |
| 2014/0240914 | A1* | 8/2014 | Meert | G06F 9/4411 361/679.02 |
| 2015/0052272 | A1* | 2/2015 | Malone | H04L 43/0811 710/113 |
| 2018/0210538 | A1* | 7/2018 | Aimone | H05K 7/1492 |
| 2018/0276024 | A1* | 9/2018 | He | G06F 9/45508 |
| 2019/0250679 | A1* | 8/2019 | Nguyen | G11B 33/127 |
| 2021/0258774 | A1* | 8/2021 | Ramsay, III | H04W 12/63 |
| 2024/0007537 | A1* | 1/2024 | Philar | H04L 67/02 |

FOREIGN PATENT DOCUMENTS

| | | |
|---|---|---|
| GB | 2605093 B | 3/2023 |
| WO | 2017/209854 A1 | 12/2017 |
| WO | 2018/009601 A1 | 1/2018 |

OTHER PUBLICATIONS

Examination Report for GB 2102877.4 (now GB 2604345), mailed on May 5, 2022. 5 pages.
Examination Report for GB 2102877.4 (now GB 2604345), mailed on Jul. 6, 2022. 3 pages.
Letter of Intention to Grant for GB 2102877.4 (now GB 2604345), mailed on Jan. 10, 2023. 2 pages.
Notification of Grant for GB 2102877.4 (now GB 2604345), mailed on Feb. 21, 2023. 2 pages.
Combined Search and Examination Report for GB 2208504.7 (now GB 2605093), mailed on Jul. 6, 2022. 4 pages.
Notice of Accelerated Examination for GB 2208504.7 (No. GB 2605093), mailed on Aug. 17, 2022. 2 pages.
Letter of Intention to Grant for GB 2208504.7 (now GB 2605093), mailed on Jan. 10, 2023. 2 pages.
Notification of Grant for GB 2208504.7 (now GB 2605093), mailed on Feb. 21, 2023. 2 pages.
Search Report for Application No. GB 2102877.4 (now Patent No. GB 2604345 B), dated Sep. 2, 2021 (1 page).
Combined Search and Examination Report for Application No. GB 2208504.7 (now Patent No. GB 2605093 B), dated Jul. 5, 2022 (4 pages).
International Search Report and Written Opinion for PCT/EP2022/055019, dated May 7, 2022 (8 pages).

* cited by examiner

Control

Path Control: | Path A | Path B | Auto
Path Gain: 28dB
Slope Control: 0dB
RF Power Alarm: 215dBm

Monitoring

VBUS: OK
RF Power: 0dBm
Path A Amp 1-2: OK
Path B Amp 1-2: OK
Temperature: OK

5V: OK
Amp Comm: OK
Path A Amp 3-4: OK
Path B Amp 3-4: OK

M2

COM-G3-S6-401                                         S/N:
Status: Fault                        SW: e599 1v07 2/09/2020

Service

Warranty expires: 15/06/2021
Release data: 15/06/2020
Hours of operation: 2332

Figure 11

MODULAR ELECTRONIC APPARATUS FOR DISTRIBUTION OF SATELLITE SIGNALS

FIELD OF INVENTION

The present invention relates to a modular electronic apparatus for distribution of RF communications signals and in particular satellite signals, and methods and software for operating the same.

BACKGROUND

It is common to provide electronic apparatus for distribution of RF signals, e.g. satellite communications or broadcast signals, and the like in modular form and received in a chassis, for instance to allow hot-swapping or upgrading of modules, or flexibility in how the chassis is provisioned for the end user. The modules may provide a wide range of functionality, for instance digital, analogue and/or RF signal processing equipment, switching, transmission/receiving equipment, etc. Often the chassis has slots for the modules to be inserted, mating to connectors in a backplane or midplane, which provides one or more connections for distributing data, control signals, power, etc between the modules and other elements in the chassis. Alternatively or additionally external interconnects can be used to make such connections. Often external connections, e.g. coaxial cables, are used to connect modules to create a signal path through the apparatus, from input to output, with each module providing different processing to the RF signal.

The chassis provides power, cooling, connectivity, user interface and management functions, and other services to the modules. These functions might be provided in modules themselves, allowing swapping or adding of power supply modules, cooling modules (e.g. fan or other air movement or cooling devices in separate modules or incorporated into the power supply modules), etc., or inbuilt to the chassis. The management module usually incorporates a CPU and provides connectivity to the chassis by which the user can manage and configure the chassis and modules. This may be built into the chassis or itself provided in a module (or plural modules to provide redundancy). In either case, the ways in which the apparatus may be configured is typically limited and controlled by the enclosure management module (as well as being defined by the physical layout of the chassis), i.e. the various combinations of modules and their interactions and the user interface to manage the modules.

While such arrangements may allow some upgrading of functionality by adding or swapping modules, typically the amount of flexibility in provisioning the chassis is designed for in advance. Any new modules that are not completely standalone, i.e. have some interoperability with the services provided by chassis and/or other modules, are constrained to work within the same operational parameters of the original chassis, and any flexibility provisioned for at that time, i.e. the capability is already built into the interface module/chassis, which normally assumes overall control for the chassis and so comprises the parameters for all possible modules and their functionality in order for them to reliable cooperate. Conceivably, firmware upgrades in the chassis or CPU/management modules may allow additional functionality to be introduced in modules at a later stage, but this is complicated to manage and still tends to be of limited use in practice. Reliability, Resilience and module performance may also be impacted. For instance, introducing a new module may stress the power supply or cooling capacity of the chassis, or lead to unacceptable levels vibration or noise, and lead to premature failure or degraded performance. The user typically has little visibility of these issues and so unable to best maintain and/or upgrade the enclosure in a timely manner. Usually, then, modular equipment provided in a chassis of this sort tends to have limited upgradability, scalability and adaptability, and so a limited service life, and entirely new systems must be introduced when it is desired to significantly change or upgrade functionality.

The present invention aims to provide an apparatus, in particular a chassis and modules, for such applications that address these deficiencies in known apparatus and allows increased flexibility, scalability and/or upgradability in how such systems can be provisioned and generally improve their performance, resilience and reliability.

SUMMARY OF INVENTION

According to a first aspect of the present invention there is provided modular electronic apparatus for distribution of RF communication signals, comprising:
- a chassis arranged to removably receive plural modules, at least some of which are arranged to receive and process RF communication signals;
- a communication path for modules to communicate with each other and/or with the chassis; and
- plural modules received in the chassis,
- wherein when a module is received in the chassis, it is arranged to broadcast a message over the communication path indicating its presence in the chassis and its type, wherein at least one other module is arranged to adapt its behaviour in response to the message.

Thus modules are aware of other modules in the chassis and can adapt their behaviour accordingly to provide services to another module or request services from another module. Thus, the "smart" modules can self organise, optimise themselves and coordinate their the way they interact preferably without a central intelligent controller overseeing all aspects of module operation and cooperation. An interface module may adapt its behaviour to allow access to a user interface generated by the module inserted into the enclosure, allowing its control by the user. The preferred embodiments the invention are based on intelligent interaction between multiple electronic devices forming a system or subsystems of electronics hardware, referred to as the habitat. The control mechanisms within this equipment, firmware or software, are regenerative, enabling new functions and new members (e.g. new modules with new functionality, or improved or modified existing functions) to facilitate evolution of the habitat, which adapts and evolves to the environment to optimise functionality and performance.

The result is apparatus capable of perpetual improvement of performance and extension of the life span. Intelligent interaction between the host (chassis) and the modules enables improved performance, functionality as well as prolonging the reliability of the equipment. This facilitates future proofing of capital investments.

Preferred embodiments provide in effect a distributed system of a collection of autonomous computing elements that appears to its users as a single coherent system controllable from a single interface, without any overarching control entity that must be preconfigured with details of all possible elements in the system. In other words, each is able to behave independently of each other to some degree, although clearly where there is no interaction, then there is less benefit in putting them into the same enclosure. In practice, modules are typically configured to achieve common goals, here providing functionality in a RF path to process RF signals, which are realized by configuration and by exchanging messages with each other. A module reacts to incoming messages, which are then processed and, in turn, leading to further communication through message passing among elements of the system.

A satellite teleport is an example of a suitable habitat where preferred embodiments can bring continuous improvements by adapting to changing requirements and evolving in size and performance. In such a smart and interactive arrangement of the apparatus, modularity facilitates growth of an intelligent electronic habitat and enables revitalisation of modules, chassis and HMI (Human Machine Interface) functions. In an embodiment the modules provides RF functionality being one or more of: amplifier, attenuator, RF filter, signal generator/source, switches, switch matrices, frequency converters, RF over Fibre modules, couplers & RF monitors, splitters & combiners, equalisers and slope compensation modules.

Messages between modules may be broadcast on a common bus. Thus, each module may listen to messages broadcast on the bus without point to point connections, and without them being specifically addressed or routed to them. This makes it easy to add new components to the system, without changing the network topology. Another advantage of a bus is that modules can listen to all communications send by other modules and so keep track of their status, fault conditions, etc. So the system is made highly adaptable via the dynamic communication messages module to module, and module to chassis, i.e. peer to peer communications rather than with a central controller as is typical in the prior art. Here, all modules are peers and none have higher priority in hierarchy of communications, i.e. there is not central module managing all other modules.

In an embodiment messages are propagated to at least a second chassis of the type claimed. Thus, the system may be expanded to cover plural chassis in a rack or location. A first chassis may thus configure/manage modules in other chassis via its interface module, and similarly modules in one chassis may request services from modules in another chassis. Typically services such as power supply or cooling will not transfer conveniently from one chassis to another, and the services are more likely to be RF signal processing services with the modules linked between chassis via external cabling to extend the signal path.

Distributed intelligence allows entire chassis enclosure to reconfigure itself on the fly and adapt to changing user settings/external events/modules being introduced/removed from the chassis, and to other modules reconfiguring themselves based on similar triggers. Negotiations are made between modules as to services provided and configuration, balancing what is possible, what is desirable, and possibly in conjunction with user priorities. Modules are autonomous and can be upgraded or replaced without effecting on-going functionality or traffic management. Modules are adaptable to the environment and signal and operational conditions. Unlike in the prior art, there is no central controlling entity. In preferred embodiments, control/self configuration is distributed with two modules negotiating services between them. A third module may in turn negotiate services with the first or second module. There may be multiple dependencies, i.e. first module interacts with second module to configure it, and the second module then interacts with a third module to configure it, and so on.

The modules contain extensive data, including house keeping information such as serial numbers, and the operational conditions that the module is subject to, e.g. max & min temperature, humidly, pressure and shock detection. The modules can react and adapt to these conditions.

The main part of the chassis (e.g. the habitat) can be configured to accommodate new modules. For example, a chassis with amplifiers can be configured to accommodate RF switches/switch matrices (RF routers). Thus, the chassis is not limited by what it was originally designed to do. In prior art systems, typically a controller is in control of the entire system, which limits how the functionality of the system can adapt over time. Here the control is peer to peer with no overarching controller. Modules can thus change their characteristics over time.

In an embodiment the chassis has a processing unit arranged to provide a user interface for the apparatus,
  wherein a module inserted into the chassis is arranged to provide a sub-user interface for displaying information relating to that module and/or controls for configuring the module, and
  wherein the processing unit is arranged to request the sub-user interface relating to the particular module and to incorporate the sub-user interface into the user interface such that the user is presented with information and/or controls for configuring the module via the user interface.

Thus, the user interface does not need to store definitions in advance about all possible module types, information and controls that relate to the modules receivable in the chassis. This information is provided by the modules themselves, and hence the user interface can adapt to completely new modules offering new functionality that was not contemplated originally, i.e. when the processing unit was originally configured. Thus, the processing unit, typically provided in an interface module or subsystem of the chassis, can provide a UI for any module without firmware or software updates. More specifically, the processing unit supports the UI, or provides UI services to the modules, which provide their own UI which can be served to the user via the services provided by the processing unit.

Preferably the user interface provides a landing page for the overall apparatus, showing status information for the overall chassis, from which subpages can be selected. Preferably the processing unit provides a security gateway to authenticate users and/or authorise access and actions taken with the modules.

In an embodiment when a module is received in a slot in the chassis, it registers with the processing unit and that module is shown and becomes selectable in the user interface generated by the processing unit, and when the user selects the module in the user interface, the processing unit requests the sub-user interface from that module and renders it in the user interface. Thus, an initial landing page can deliver details of which modules populate which slots in the chassis and provide selectable links that load the sub-user interface from the selected module, i.e. a webpage stored on the module.

In an embodiment the user interface comprises webpages, the processing unit provides a webserver arranged to serve at least one webpage associated with the chassis, and comprises a module web proxy server to request a website from modules registered with the processing unit to provide sub-user interfaces for those modules. The website associated with a module may comprise plural webpages that are individually requested by the processing unit. Preferably, the webserver shows a graphical representation showing the layout of modules registered in slots in the chassis, and user selectable links for the modules to cause the webserver to request a webpage from the respective module.

In an embodiment at least one module is arranged to perform peer control, whereby through a peer control channel, the module requests services from other modules registered in the chassis. Typically modules are preconfigured with the services they require from other modules in the chassis in various modes of their operation, e.g. power requirements, amplification of signals, etc, and can request these services via a broadcast message upon insertion/powerup in the module, or user configuration, or external or internal event which causes a change in the services required. Services may include, but not limited to switching, gain configuration, frequency configuration, power, and cooling.

In an embodiment at least one module is a shared resource, arranged to receive requests for that resource from other modules registered in the chassis, determine whether it has sufficient resources to meet that request, and if so, to supply the requested resource, or else to send a message indicating that the request cannot be met. Thus, modules may be configured to monitor incoming requests for services of a type they provide, as well as monitoring their ability to deliver that service given demands already made on that module and remaining resources, e.g. a power supply module may keep track of the cumulative demands made on its power supplying capabilities from other modules, when determining whether or not it can service a new or modified request. The result of the determination can be communicated to the user, either via the HMI or via an email or other message.

Power may be managed intelligently to ensure that it is distributed in line with operational protocols. Examples are:
a) If there is not enough power some modules are not turned on or the new module is not powered.
b) Switch modules/switch matrices are equipped with adaptive routing to preserve power, optimise performance. The module level actions are also governed by chassis and rack level characteristics when the equipment is configured as a larger scale system of series of sub-systems.
c) The power sharing may be reconditioned to ensure adequate distribution. For instance, a chassis may have 4 amplifier modules drawing 1 A each, and 4 LNB modules drawing 250 mA each. Based on the available power, the PSU module may choose to power up, say, all the LNB modules and 3 amplifier modules rather than 4 amplifier modules and no LNB modules to provide the best capacity to the operator. Alternatively, the user may configure priorities via the HMI, such that certain modules are powered in preference to others. Alternatively, the decision on which modules to power up may be made by a signal monitoring module which detects the presence of RF power, i.e. a modules is only powered up when it is detected that it receives a RF signal.

In an embodiment the shared resource has plural operating modes in which the shared resource may be supplied, the module being arranged to change its mode of operation in order to satisfy a request for a resource. For example, a power supply module may change its level of redundancy such that more power is made available for supply to other modules, allowing a request for power from a newly inserted module or reconfigured module to be met. Similarly a cooling unit may switch on a spare redundant fan in response to a request for more cooling, or to increase fan speed.

In an embodiment the shared resource monitors the presence and status of other modules in the chassis, and is arranged to configure another module such that the request can be satisfied. Thus, chains of intelligent configuration between several modules may be implemented. For example, the power supply module may know from monitoring the presence and status of other modules in the chassis that another module is operating as a "hot redundant" module, i.e. powered on but inactive, and can send a message to this module reconfiguring it as "cold redundant", i.e. powered off until needed, to reduce the power that must be supplied to this module, so freeing up more power to satisfy a request for power from another module. Alternatively another module may be powered off completely.

The decision on changing mode of operation in a module or another module may be balanced with other considerations local to that module or other modules, such as loss of redundancy, slower recovery from failure, decreased service life of accepting above optimum temperatures, decreased service life or increased noise in increasing fan levels, etc. Thus, the modules monitor their own operating conditions in order to decide whether or not it is beneficial to meet the request for a resource.

In an embodiment the module causes a message indicating to a change of configuration is communicated to the user. The user may be prompted to approve the new configuration before it takes effect.

In an embodiment the request for a shared resource is initiated by a module receiving a new user configuration via the user interface, or via detecting an event within the module, or a change in configuration in another module. The event may be excess temperature, giving rise to a request for additional cooling from a cooling module; signal degradation, giving rise to a request for amplification or signal smoothing from another module, etc.

In an embodiment at least one module is arranged to perform peer monitoring, whereby through a peer monitoring channel, modules can discover status and of other modules registered in the chassis upon which they may rely to achieve desired system configuration and/or performance.

In an embodiment a module changes its mode of operation in response to detecting a change in status of another module. For example, a module may reconfigure itself from hot to cold redundant in response to detecting that a power supply module has failed or degraded performance.

In an embodiment at least one module is arranged request and store configuration settings for at least one other module and to configure a redundant module or to a replacement module with those configuration settings in the event of failure of the primary module. Thus, modules can in effect learn and back up settings of other modules, such that if those other modules are replaced, the system can be automatically reconfigured without further user input.

In an embodiment the module storing the configuration settings is a redundancy switch, arranged to switch between the primary module and a redundant module in the event that it detects that the primary module has failed.

In an embodiment at least one configurable module suppling services to another peer module is a power supply, a cooling module, and/or a reference frequency generator.

In an embodiment at least one module has the capability of monitoring conditions can re-route signals to increase performance based on knowledge of other modules in the chassis. For instance, a module may monitor signal conditions, determine path is not optimum and route via a new path, different amplifiers and/or filters to dynamically improve signal conditions.

In an embodiment peer monitoring determines that another module is running an outdated software/firmware version, and causing a message to be sent to the user to indicate an update should be performed and/or limit protocol elements used based on compatibility across all modules. Thus, a "newer" module in the chassis may identify another module with "old" firmware. The user can be alerted and/or the newer module may provide a software update for other modules around it, giving the user the option to allow such an upgrade, thus enabling more advanced functionality. Also, the module may limit it its own functionality or cause other modules to limit their own functionality to a subset of possible functionality such that there is no mismatch between the old and new modules, i.e. the new modules do not try to request "new" functionality from the old module, which cannot understand the request because it is lacking the required protocol extensions/functionality. Software updates to the modules may change characteristics and behaviour of those modules.

In an embodiment a module monitors at least one metric indicative of its cumulative performance, and compares this against a threshold, and sends a message to an operator when the metric is close to or exceeds the threshold indicating that the service life of the module is approaching or past and the module should be replaced. Thus, the intelligent module analyses its operational life and communicates this to the operator via the HMI. Additionally or alternatively it may also be equipped with smart functions to prolong its life. For example, a fan may have m+n fans for cooling where m is the number required and n is the number of spare dormant fans. The n th fan could remain dormant, or be activated if any of the active fans display symptoms of sub standard operation, or if the chassis is equipped with modules where heat dissipation is such that an increase in cooling is selected for optimum performance. The system could intelligently choose which fan to make redundant based on various considerations, such as maximising the life span of the module, reducing the power requirement, etc. These principles can be extended to allocating operations between modules. In an embodiment, plural modules monitor at least one metric indicative of their respective current and/or cumulative operation/performance, wherein in response to a request for a resource, the modules cooperate to select one or more modules to provide that resource from those capable of providing that resource based on sharing the load equally among the modules or allocating the load to those modules identified as being least likely to fail based on the monitored performance data. Thus, it would be possible for smart modules, particularly those that include electro-mechanical components where life is determined by number of switching operations, to distribute operations in such a way that all elements of the system "wear" at a similar rate. It would be possible that smart modules with such self-monitoring algorithms would provide the ability for user configurations, requirements or routing paths with higher priority are assigned to modules determined algorithmically to have lower likelihood of failure.

According to a second aspect of the present invention, there is provided a chassis for modular electronic apparatus for distribution of RF communication signals, the chassis arranged to removably receive plural modules, at least some of which are arranged to receive and process RF communication signals,
 the chassis including a communication path for modules to communicate with each other and/or with the chassis,
 the chassis including or capable of receiving an interface module, arranged to listen to messages on the communication path indicative of a module being inserted into the chassis and in response to register the module in the chassis and provide a user interface for communicating with and/or controlling the module.

According to a third aspect of the present invention, there is provided a module for modular electronic apparatus for distribution of RF communication signals, the module being receivable in a chassis arranged to removably receive plural modules, at least some of which are arranged to receive and process RF communication signals,
 when a module is received in the chassis, it is arranged to broadcast a message over the communication path indicating its presence in the chassis and its type, wherein the or at least one other module is arranged to adapt its behaviour in response to the message.

According to a fourth aspect of the present invention, there is provided a method of configuring modular electronic apparatus for distribution of RF communication signals, the method comprising:
 inserting a module arranged to receive and process RF communication signals into a chassis;
 in response, the module broadcasting a message indicating its presence in the chassis and its type;
 in response to the message, at least one other module adapting its behaviour. Another aspect relates to software for carrying out the method.

It will be appreciated that any features expressed herein as being provided "in one example" or "in an embodiment" or as being "preferable" may be provided in combination with any one or more other such features together with any one or more of the aspects of the present invention. In particular, the extendible member, joining techniques and join testing system described in relation to one aspect may generally be applicable to the others. While aspects of the invention relate to RF signal processing apparatus, the principles described herein may apply to any apparatus that is provided in a modular form in a chassis where at least one module provides services to another module, and where the "smart" modules intelligently communicate to negotiate the services they require from and/or can provide to each other and so self organise without a central controller handling this task. Thus modules may relate to digital signal processing, analogue signal processing, RF signal processing, switching, amplification, computing or CPU modules, storage modules, etc or any combination, typically in combination with power supplies and/or cooling modules.

BRIEF DESCRIPTION OF DRAWINGS

Embodiments of the present invention will now be described by way of example with reference to the accompanying drawings, in which.

FIG. 11 shows an example of a module webpage;

ABBREVIATIONS

BDC Block Down Converter
BUC Block Up Converter
CAN Controlled Area Network
CPU Central Processing Unit
DC Direct Current
HMI Human Machine interface
HTTP Hypertext Transfer Protocol
HTTPS Hypertext Transfer Protocol Secure
LAN Local Area Network
LNB Now Noise Block
PSU Power Supply Unit
RF Radio Frequency
SNMP Simple Network Management Protocol
UI User Interface
WAN Wide Area Network

DETAILED DESCRIPTION

Figure 1A:
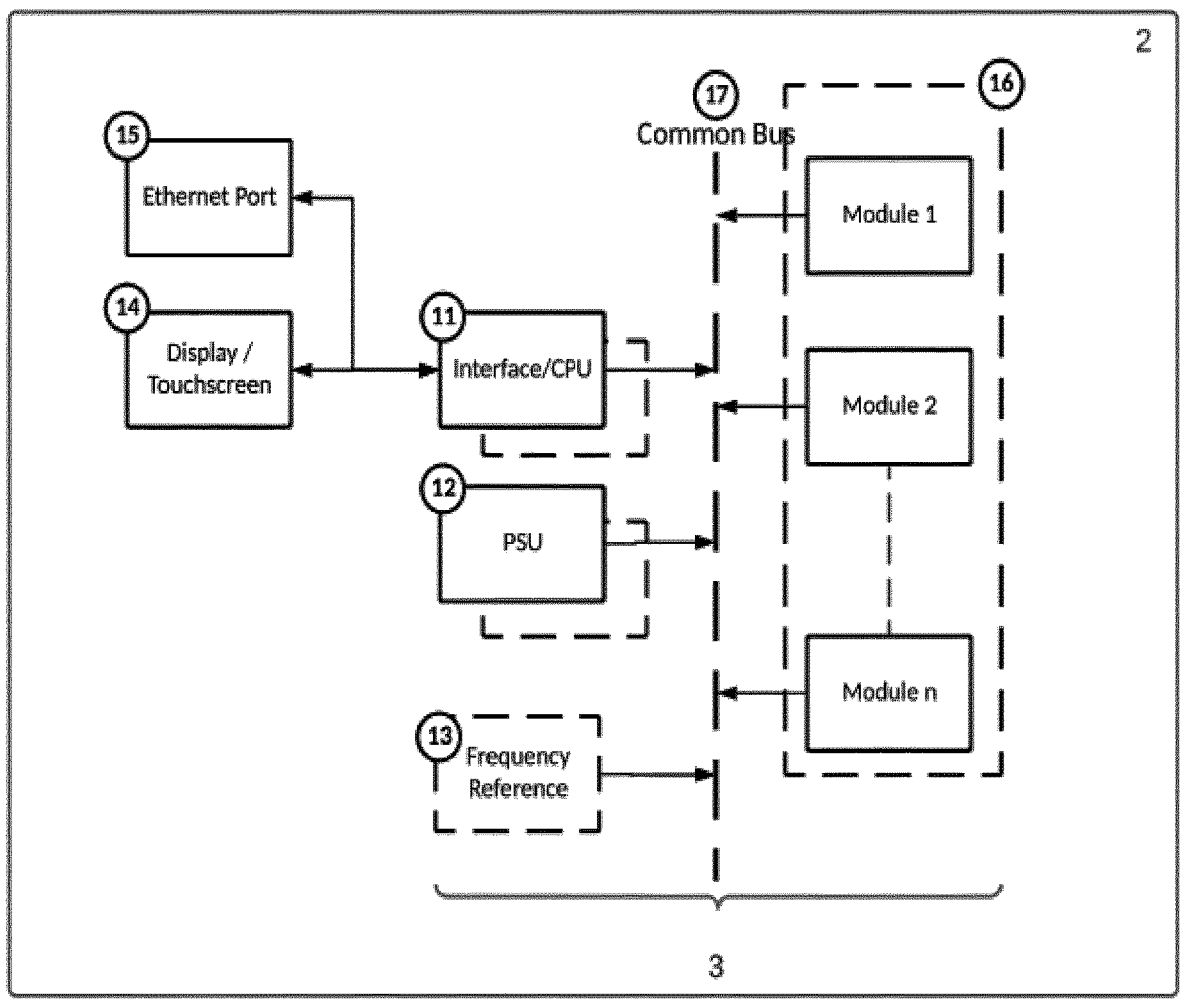
FIG. 1A shows the overall architecture of an example of a system according to an embodiment of the present invention.

FIG. 1A shows the overall system architecture of an example of a modular electronic apparatus 1. The apparatus 1 comprises a chassis 2 which acts as a host to a plurality of modules 3 received in the chassis 2. The modules 3 are received in slots in the chassis 2 and mate with a docking plane, e.g. backplane or midplane comprising one or more buses 17 by which power, data and control signals may be provided to and between modules and between modules and the chassis. The chassis may be designed to fit standard 19" racks (not shown). A module may be used interchangeably in plural chassis, e.g. an indoor unit and an outdoor unit, or chassis of different sizes.

Some or all of the modules 3 relate to a particular application or applications provided by the enclosure (named "application modules 16" herein). The modules may provide a range of functionality according to the application, which as discussed above, may take many forms, e.g. storage, computing equipment, analogue or RF signal processing equipment, etc. In the present example, the modules relate to RF distribution equipment for a wide range of applications in the RF chain. For instance, on satellite downlinks this may be between the Low Noise Block and the modem or receiver; and on satellite uplinks it may be between a modem and a BUC. Functions can include switches, reference signals, fibre optic converters, amplifiers, splitters/combiners, switch matrixes for redundancy and RF signal routing, etc. The modules receive one or more external signal process the signals in turn and output the processed signal, i.e. creating a signal path through the equipment. The modules may pass signals between themselves via external interconnects (not explicitly shown), e.g. coaxial cabling, or via internal links, e.g. dedicated links on the docking plane. The modules may have external interconnects for connecting to other enclosures with modules of the sort described herein, or other upstream or downstream devices. The modules may all have the same or similar functions, but equally may have a number of different functions. Other applications and functions are equally possible.

In the present example, FIG. 1A, the modules comprise plural frequency converters, switches, and an optional Frequency Reference 13 which provides a reference frequency to those modules.

The system 1 further comprises one or more power supply (PSU) modules 12, which provide power to the other modules and enclosure generally. Cooling modules comprising fans to create a cooling airflow through the modules may also be provided, or cooling fans may be incorporated in the PSU modules, or cooling fans may be inbuilt to the chassis. These modules may be considered "support modules" as they provide generic services needed by the other modules. Nonetheless, these definitions are mainly for convenience, and it will be appreciated that Application Modules 16 may provide services to other Application Modules, as will be come apparent from the disclosure as a whole.

The system 1 also comprises one or more interface modules 11 (also referred to as a CPU module herein) comprising a CPU 111 which generally provides a Human Machine Interface (HMI) to the chassis and modules and potentially other chassis management functions. The system 1 also comprises an optional touchscreen display 14, one or more connectors, e.g. Ethernet ports 15, for external communications with the chassis via the interface module 11.

The chassis has one or more common busses 17 which provide a communications link between some or all items in the chassis as well as delivering power. In this case, the busses allow communications between all modules, apart from the touchscreen 14 and ethernet ports 15 which communicate directly with the CPU in the interface module 11 and may be incorporated within the same module as the CPU. As described below, the bus 17 play an important role in allowing modules to broadcast messages to other modules in the chassis. For instance, a CAN (Controller Area Network) bus or similar protocol may be used to propagate messages.

At least some of the modules 3 are removable/replaceable in their slots (although some may be fixed, e.g. interface module, PSU modules, cooling units may be built into the chassis) and preferably hot swappable to allow seamless replacement of failed units/upgrades, etc.

Figure 1B:
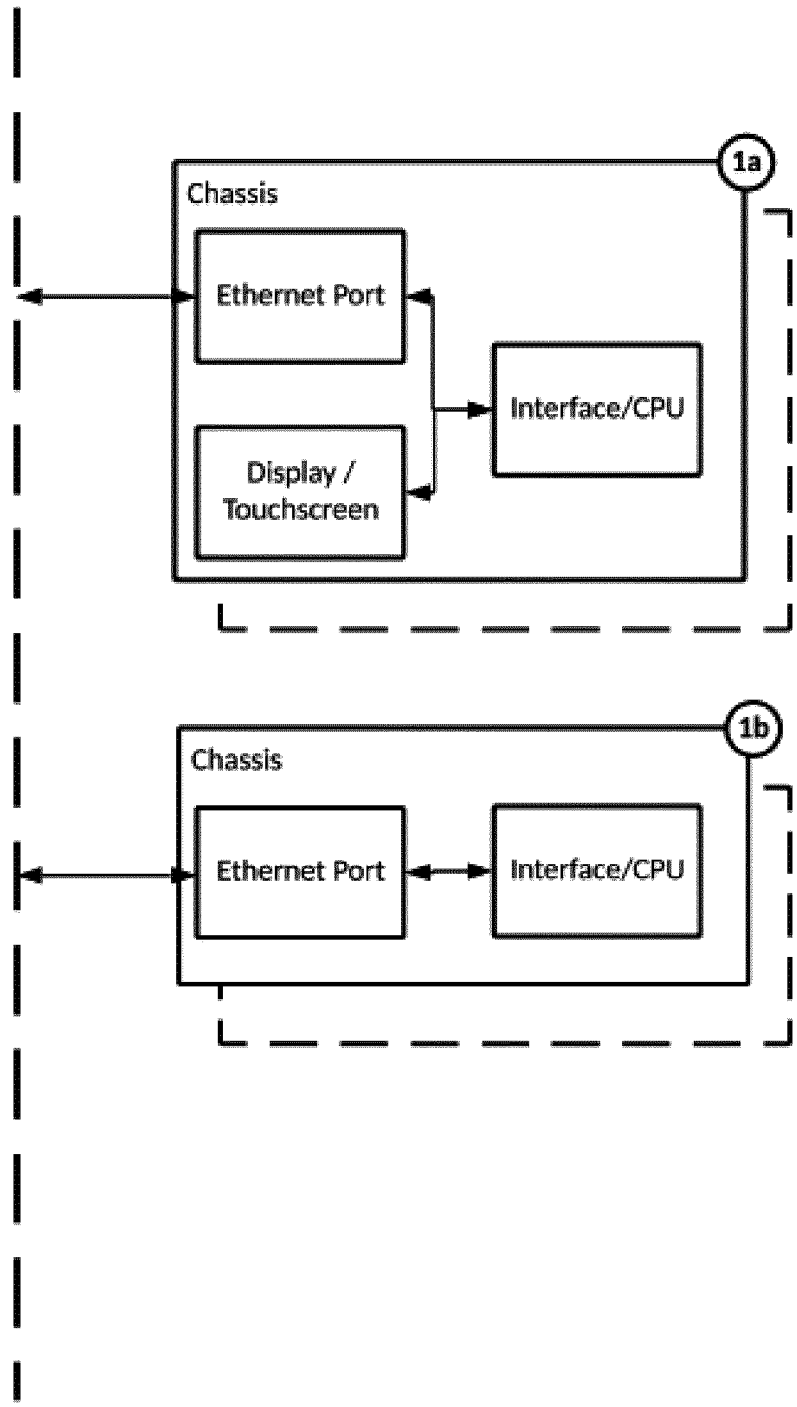
FIG. 1B shows plural systems of the type shown in FIG. 1A connected together.

FIG. 1B shows that two or more such enclosures 1a,1b can be connected together, e.g. via an LAN via the ethernet connectors, to extend functionality between enclosures to form a system of systems. This is described in further detail below.

Figure 1C:
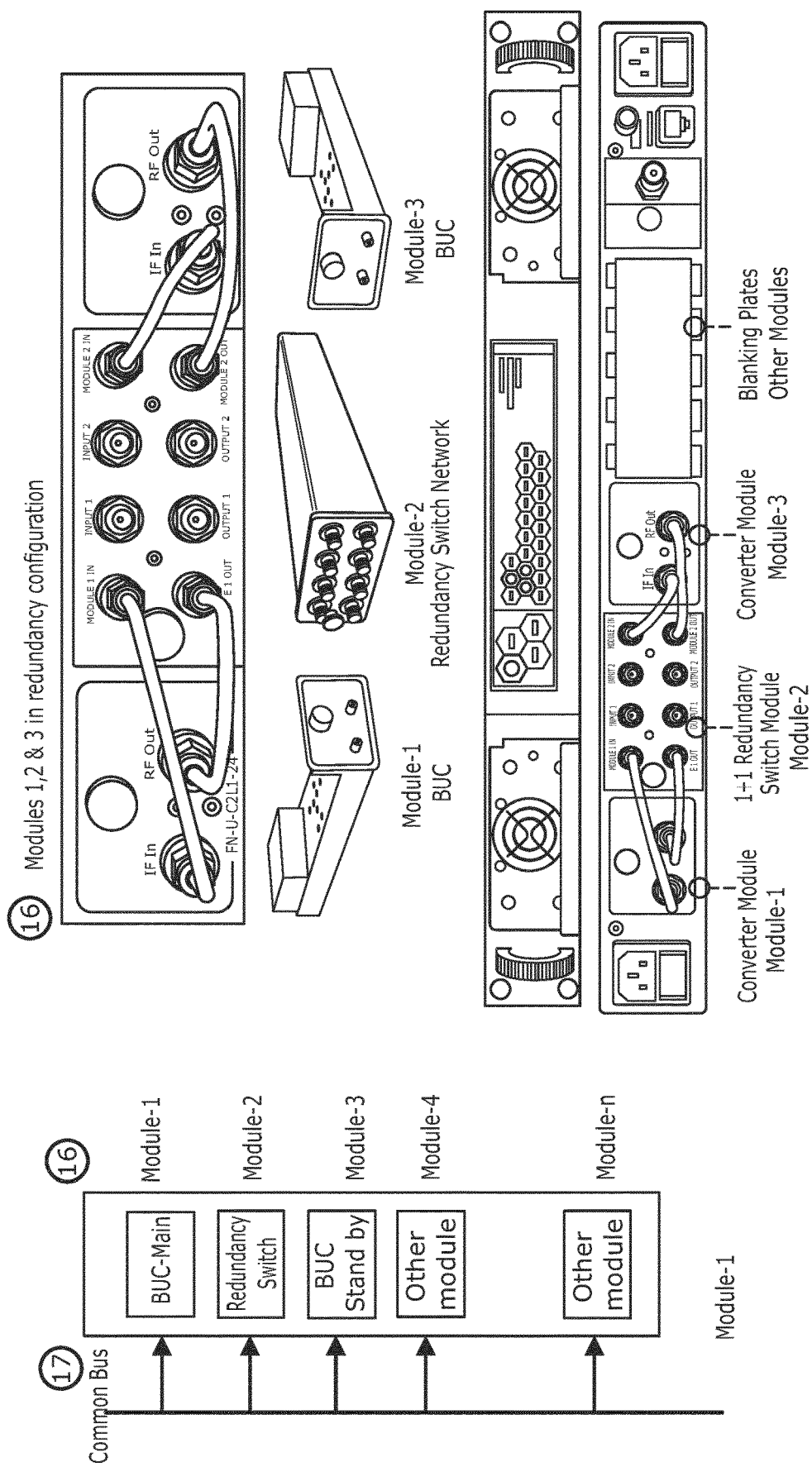
FIG. 1C shows functional blocks shown in FIG. 1A where examples of the removable modules and the chassis are illustrated by way of hardware images.

FIG. 1C shows functional blocks shown in FIG. 1A where examples of the removable modules and the chassis are illustrated by way of hardware images. In this example, a 1 U chassis contains a primary and standby BUC modules and a 1+1 redundancy switch in the populated slots.

Figure 2:
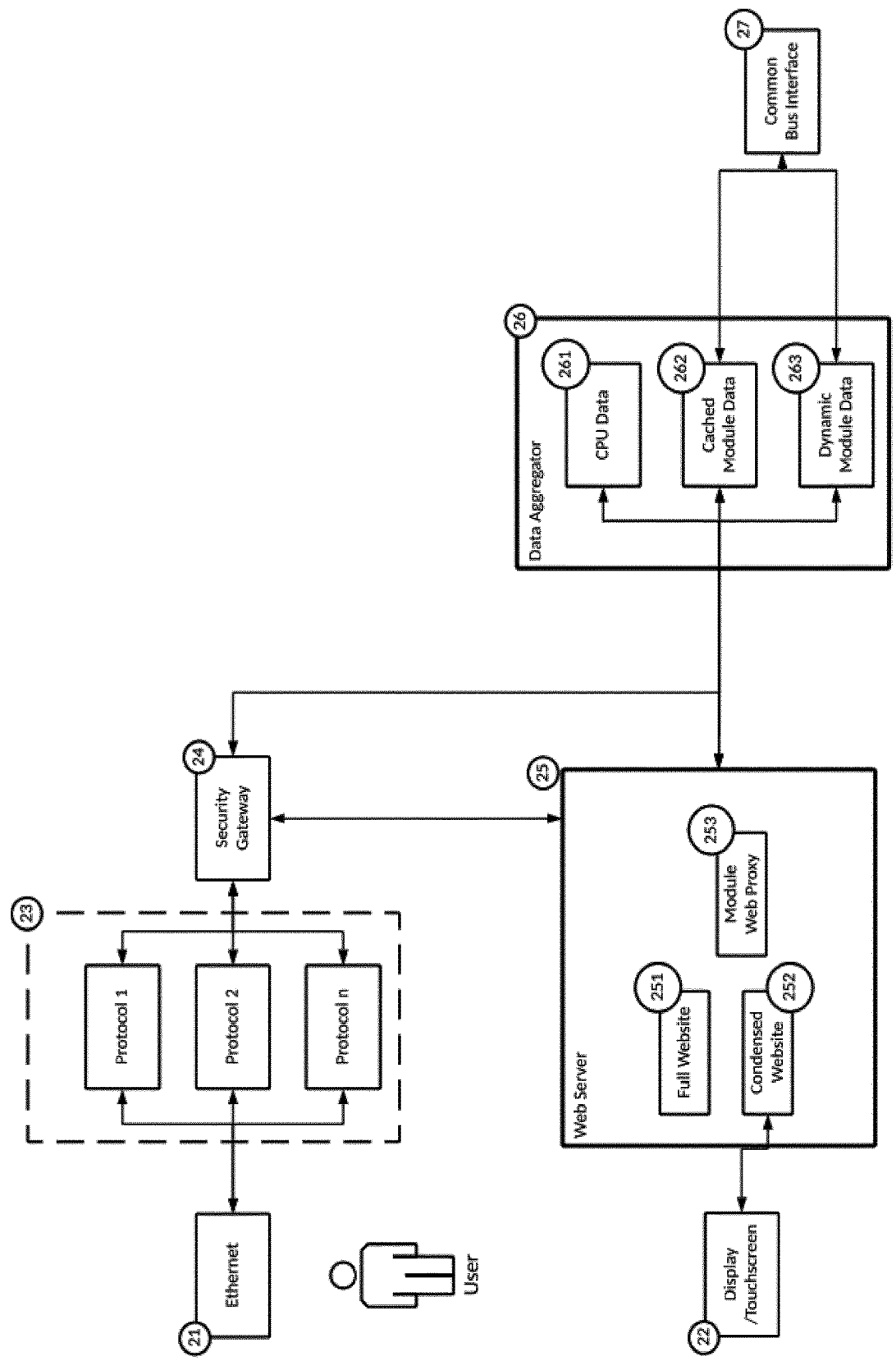
FIG. 2 shows the interface module/subsystem architecture of the system.

As show by FIG. 2, and as discussed above, in this example, the interface module 11 provides the one or more Ethernet ports 21, the optional touchscreen display 22, one or more protocols 23 for interfacing to the outside world.

Examples include, but are not limited to SNMP, HTTP, HTTPS other proprietary protocols. Thus the Ethernet port can be used for communicating remotely with the chassis across a LAN or WAN, while the touchscreen provides local access.

The interface module 11 also comprises a security gateway 24 to manage the security of all module accesses. The security gateway 24 may manage user credentials, authenticating and authorising users to take various actions, dual factor authentication, strong passwords, number of sign-in attempts, providing an encrypting link, etc.

The interface module 11 also comprises a web server 25 including, but not limited to any of: a "Full Website" for remote access 251, a "Condensed Website" 252 for use by the optional touchscreen display 14 where present, a module web proxy 253 which serves webpages generated by the modules to the full and condensed websites. The interface module 11 also comprises a Data Aggregator 26, which aggregates data received from preferably all modules in the chassis (including application modules, PSU, Frequency Reference Card). This data comprises, but is not limited to:

1) enclosure data 261 which includes items integral to the interface module/chassis such as security settings, network settings, and any other settings whose data solely resides in the interface module/chassis.
2) Cached module data 262.

At start-up, i.e. the enclosure being powered up or a new module being inserted into the chassis or powered up, each module broadcasts "static" data over the bus such as Serial Number, Web Page Structure, which the interface module caches to avoid excessive traffic over the common bus 7.

3) Dynamic Module Data 263.

Each module periodically sends data pertaining to its current operational status, which may include but not limited to fault conditions, performance parameters and the operational conditions that the module is subject to; e.g. max & min temperature, humidly, pressure and shock detection.

Figure 3:
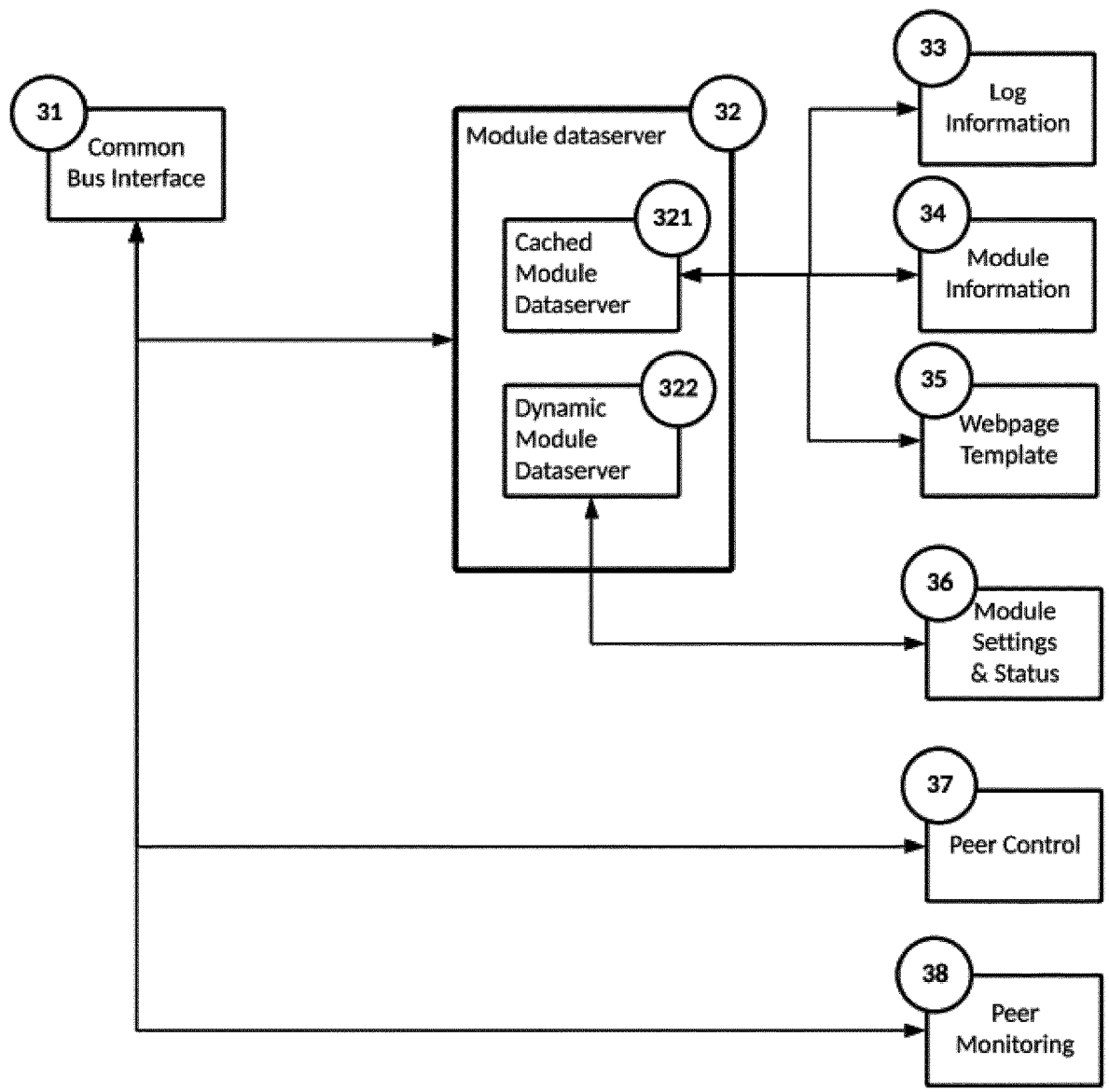
FIG. 3 shows the general module architecture of the system.

FIG. 3 shows a schematic view of the module architecture, as may apply to any of the modules 3 in the chassis 2, i.e. the application modules, PSU, reference modules, etc., apart from the interface module 11 described above. The module 3 comprises: an interface 31 into the common bus 17, by which the various components of the module communicate with other modules and with the chassis. The module comprises a module data server entity 32 comprising: a server 321 for the static data and a real time or dynamic data server 322, which propagates the real time performance or fault data, which as described above will be cached by the interface module 11.

The module 3 includes storage in which it records a log 33 of all events the module has experienced. It also stores module information 34, which includes items such as hardware & software versions and module type. It also stores webpage templates 35, which defines the layout of the webpage or webpages for that module, including the controls & information exposed at each user level. As described, this information is sent to the interface module 11 by the cached module data server 32.1, stored in the data aggregator and used by the interface module webserver to render a webpage for that module. For example, certain information or settings may only be exposed to certain user levels, such as to higher Admin levels, and not to lower "User" levels. The module also stores module settings 36, which includes user control settings and the status of the module. This dynamic information is sent to the interface module 11 by the module data server 32 and stored in the data aggregator 26, and used to populate placeholders in the cached webpage template & status in rendering the webpage for that module.

The module 3 further comprises a peer control subsystem 37. Through this channel, modules 3 can request services from other modules 3 via messages broadcast on the common bus 17. Services may include, but not limited to switching, gain configuration, frequency configuration, power and cooling.

The module 3 further comprises a peer monitoring subsystem 38. Through this channel, via listening to messages broadcast on the common bus 17, modules can discover the status and capabilities of other modules in the system upon which they may rely to achieve desired system configuration and/or performance. The capabilities are broadcast by the modules as part of the static data, whereas real time module status is broadcast, either periodically or in response to events, as part of the dynamic data. Thus, this module listens for broadcast messages on the bus from other modules, e.g. a fault condition message, or a particular module is operating in a non-redundant mode, etc. as discussed further below in relation to specific examples. The module also has the capability of requesting information from other modules in the chassis, and so can obtain the necessary information about the other modules in this way.

Figure 4:
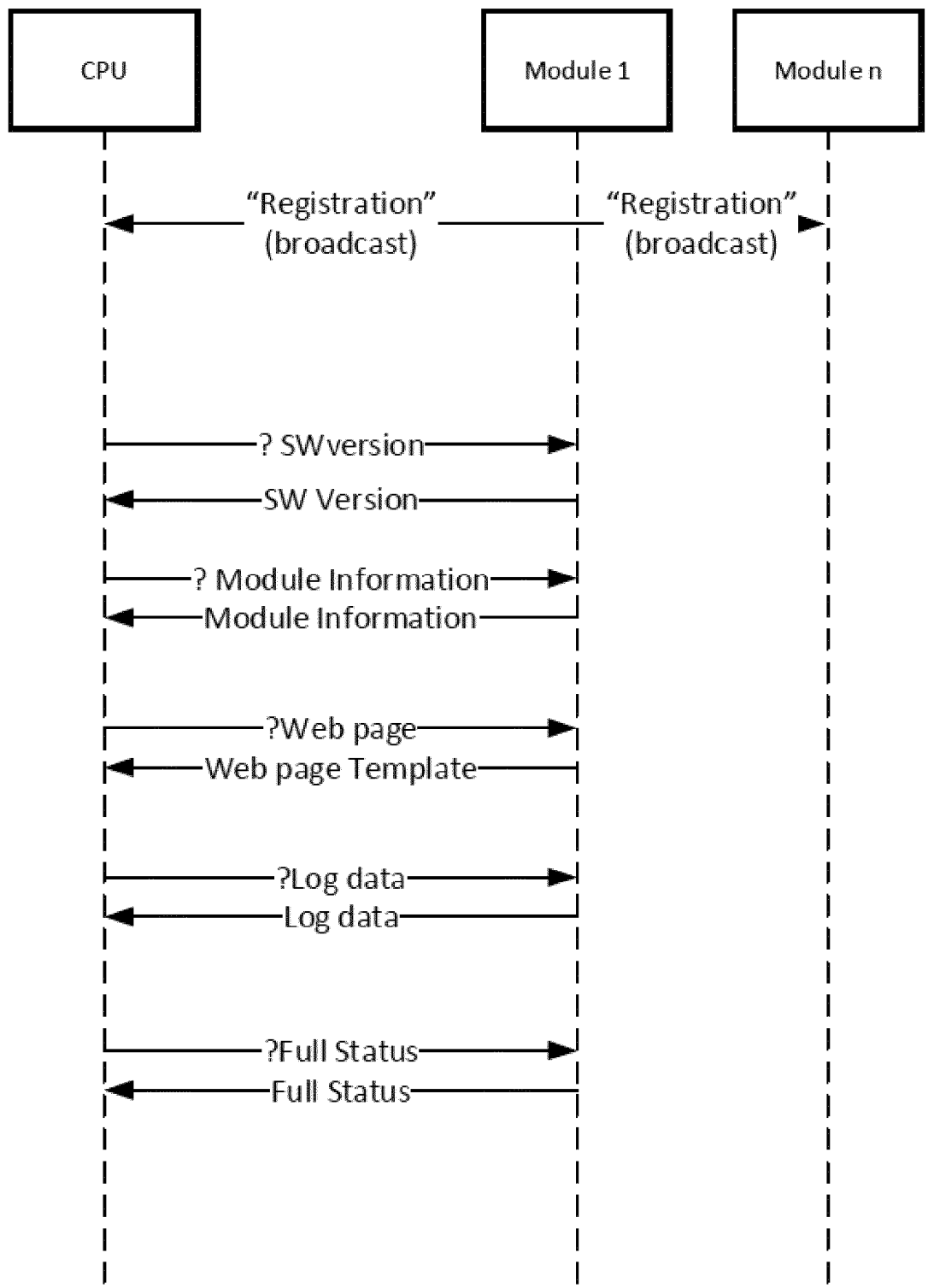
FIG. 4 shows an example of the flow of data when registering a module in the system according to an embodiment of the present invention.

FIG. 4 shows a flow which describes the process when a module 3 is first introduced to the system. The module informs the system of its presence by broadcasting a message comprising its slot identifier and module type. The slot identifier is marked electronically in the chassis 2, in this case, by a resistor value, allowing the module to read a unique slot identifier and report this to the interface module, but numerous other methods could be employed. The interface module 11 knows the number and preferably layout of slots in the chassis, and so can map the module to a position in the chassis. This registration message is used in other flows, as described below. On receiving a message indicating a new module in the system 1, the interface module 11 sends one or more information requests to obtain the cached data from the module by way of the module data server 15,21. The information from any modules previously received in that slot is overwritten at this point. Other modules in the chassis 2 may also now interact with this new module. Other modules receive the same registration message as the interface module and therefore also know which module is in which slot and its type. The cached data broadcast by the module includes its capabilities, i.e. the services it can supply to other modules and/or its requirements and operating parameters. Other modules may or may not adapt themselves based on newly introduced module as described below. The interface module needs no prior knowledge of possible module types for this to be implemented.

A user can then communicate with the chassis 2 and any of the modules 3 as follows. The user sends a request to the interface module webserver 25 for a webpage via the Ethernet connection 31 to the chassis 2. The user authenticates as necessary with the security gateway by entering their credentials. Once, it has been established that the user is authorised, the webserver provides the requested webpage. Typically the first page is a "landing page" which gives general information on the enclosure, including but not limited to which modules populate which slots in the chassis, which the interface module has established via the registration messages sent by the modules when inserted. To interact with a particular module, the user selects a link or control associated with the appropriate module/slot in the webpage, which gives rise to a request to the module web proxy to render the webpage for that module via the data stored in the data aggregator. In particular, the previously cached web template is populated with cached static and dynamic data for the particular module. The webpage is served to the user by the webserver 25. This may appear in a separate screen, or a frame of the original webpage for instance. Thus, the user is presented with any relevant information concerning the module and its operation and performance. Additional module webpages for that module may be available and linked to. The user can interact with the controls in the module webpage, which gives rise to a request that is sent to the module via the module web proxy and results in the module configuring itself. For instance, the user may configure switches in the modules, gain settings, redundancies, etc.

Figure 10:
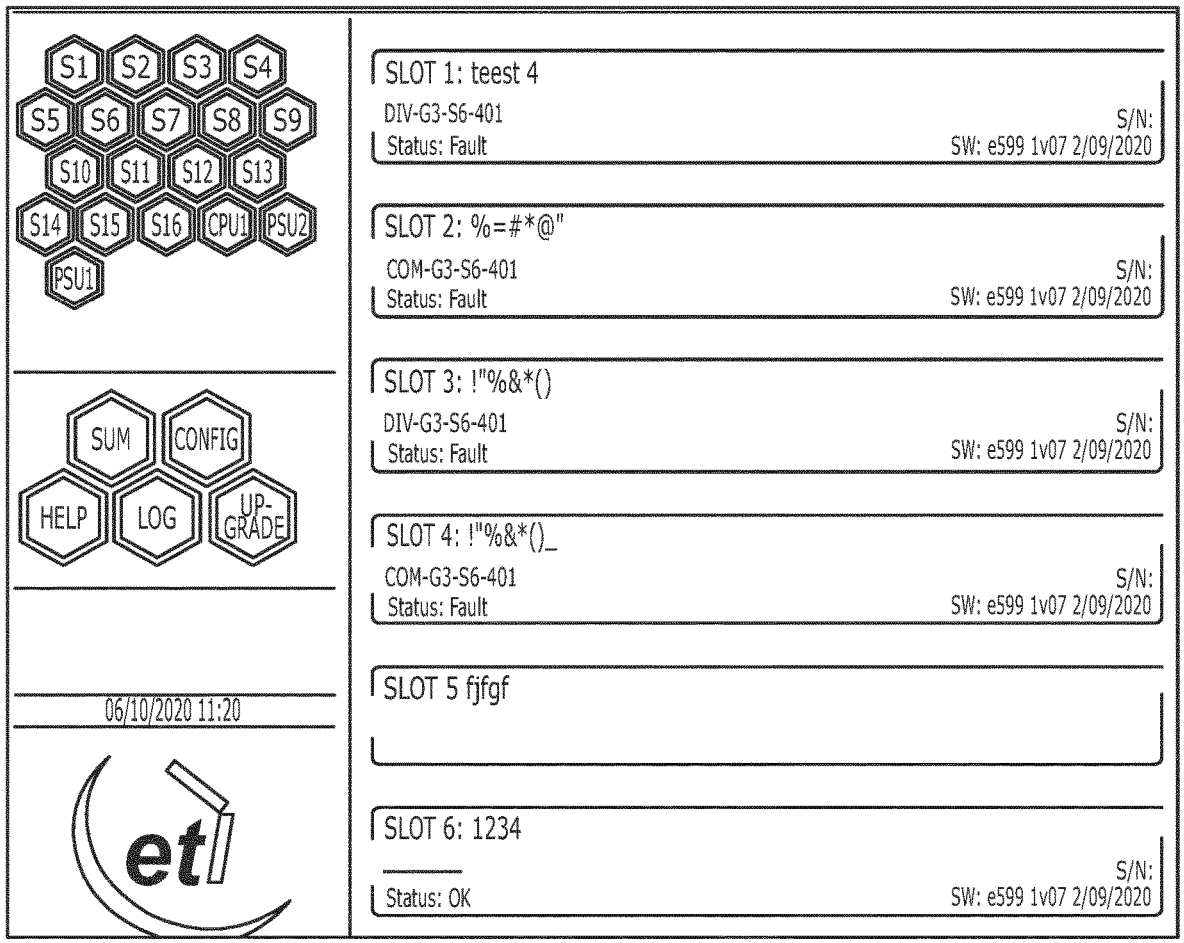
FIG. 10 shows an example of a webpage provided as part of a HMI according to an embodiment of the invention.

Thus, for instance, FIG. 10 shows an example of a webpage served by the interface module as part of a HMI showing the occupancy and status of the slots in the chassis 2, as well as controls and information relating to the chassis as a whole. As can be seen, the chassis is populated with 13 out of 16 application/support modules, one interface/CPU module 11 and one of the two available PSU slots (with unoccupied slots greyed out). Status information is shown by colouring the cells representing the slots. By clicking on a module, the proxy webserver 25 brings up a webpage for that module, as shown by FIG. 11. The user can control various parameters, such as path control, path gain, etc. The monitored parameters of the module are also shown, together with serial number, firmware and operational parameters.

A similar process is used when the user accesses the enclosure via the touchscreen 22, except that typically a condensed website is served, e.g. webpages that are simplified or lower resolution, suitable for a smaller screen.

As described below, modules can automatically generate e-mails/electronic messages to inform end of life and service requirements. Examples are fan modules and PSUs which tend to have a limited life span due to moving parts.

The HMI provides active house keeping and monitoring of the environmental conditions in the chassis, e.g. through temperature sensors in the chassis, or in conjunction with the modules, via their sub-user interfaces, where they have this facility, e.g. some modules may have individual temperature sensors. Thus, the HMI provides cellular, interactive management tools enabling status control and checks of all activities within the habitat. Three level cellular interaction is provided in the example of FIGS. 10 and 11. Colour is used for status, i.e. operation is OK, warning, fault. User selection is indicated by fill and border colours. Symbols are used to indicate the function of the module fitted to the slot.

In FIG. 11, the user has highlighted slot 2, whose status is shown. Modules are individually configurable and upgradable with software/firmware/settings via the controls on the webpage. Thus, the user can configure the various modules in the enclosure to perform some overall application, i.e. a sequence of operations performed by plural of the modules on an input to the enclosure to produce a desired output according to the application. In the present RF application, this may comprise receiving microwave signal from a satellite transponder, amplifying and filtering the signal, converting the signal to an intermediary frequency signal, cleaning the signal and switching the signal to one or plural possible destinations, e.g. a modem configured to transmit the signal over a cable connection to the next site.

Thus, the system provides a distributed cloud of web servers within the modules, and so provides a resilient network and device management system. The chassis/interface (CPU) module 1,11 provides a habitat that is populated by modules 3 being introduced into the system 1 where the modules themselves provide the means for their management via the framework provided by the chassis/interface module 11. Unlike in prior art schemes, the interface module does not need to know anything beforehand about the modules it will be controlling/interfacing with. The modules themselves provide the HMI functionality needed to control/interface with them, and the interface module 11 provides a framework by which this functionality is made available to the user by providing a web proxy 25 to access the module webservers 32 based on the registration details, and serve this information to the user. The system is therefore highly versatile and future proofed and can provide a HMI for the user to interact with new modules without requiring firmware updates to the interface module to extend the HMI for the new module to work.

Figure 12:
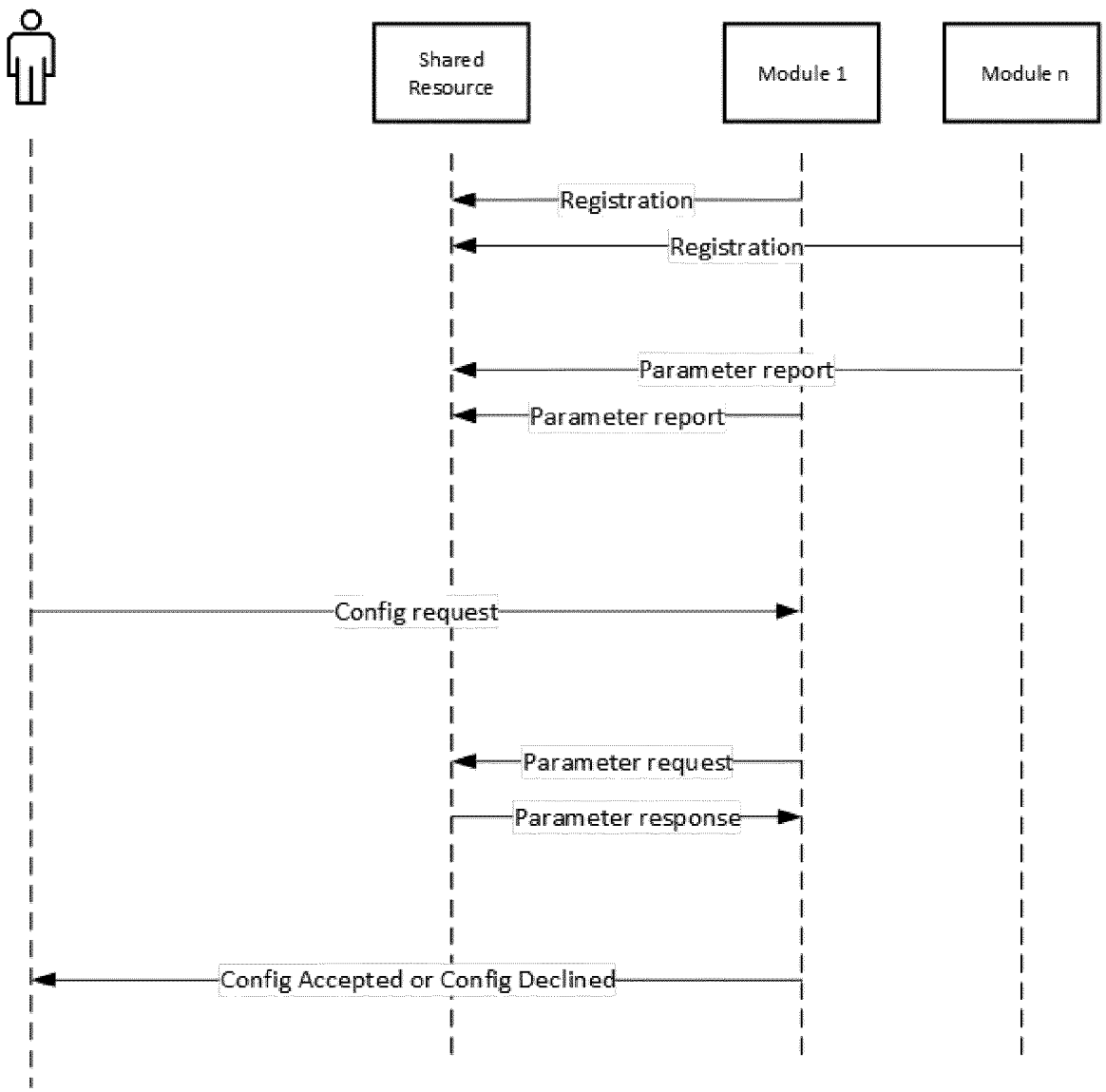
FIG. 12 shows an example of the generic flow of data when a module is activated within the system.

These principles of intelligence distributed among the modules 3 also extend to intelligent interaction between modules, e.g. between application modules and support modules, such as between the PSU modules and RF modules, or between RF modules, which can configure each other and provide services to each other, as will become clear from the following detailed examples. FIG. 12 shows a general process in which modules 3 make demands of a generic shared resource. As described, the modules broadcast registration messages when they are first inserted/powered on. The shared resource is made aware via these messages at registration of the initial demands of each module (and can identify which demands relate to the particular resources it can provide, checks it can service the demands and allocate those resources). The module data server 32 of the module periodically reports its usage of that shared resource, which is noted by the peer monitoring subsystem 38 of the shared resource. Thus, the module can track usage of the resource. At some future point a user reconfigures a module in such a way that the module demands on the shared resource are affected. (NB this could also be caused by events—either internal, such as a temperature rising beyond a threshold such that the module recognises that it must request additional cooling, or external, such as degradation in a received signal such than amplification is requested, etc.) The peer control subsystem 37 of the module checks with the shared resource whether it is able to service the pending module requirements and sends a response to the requesting module. If the request cannot be serviced, the user is informed that the reconfiguration request is declined. Alternatively, the request may be accepted with a warning of degraded performance (i.e. where one or both modules can operated in different modes, the modes may be changed to allow a request to be met). This may be accompanied with a message for the user to confirm that they accept the degraded performance. Otherwise, the user reconfiguration request is accepted. A specific example of this generalised approach is given in FIG. 6, where the shared resource in question is power supply module. A PSU may inform, as a part of this peer control mechanism, that it does not have enough power to satisfy the demands of a requesting module. Another example might be the determination of reliability of the shared resource, where the module may have the choice of a number of shared resources.

Thus, modules 3 broadcast their status and types/capabilities to other modules on the bus 17, so that those modules can determine whether they need to reconfigure themselves in response to those messages. This may include requesting resources from those modules or configuring another module. Each module generally knows its own modes of operation and the resources it can supply to other modules, or needs to demand from other modules for each mode (e.g. power, cooling, signal amplification). Based on the demands made of that module, or its demands of others (for instance, occasioned by a user change in configuration or another event in the enclosure), it can determine which mode of operation may be implemented, control other modules to change their behaviour, or refuse demands and issue appropriate warnings and information to the user via the HMI.

Typically, then, each module implements an algorithm to determine its requirements, request those from other modules, and adjust its mode of operation as required in response to those requirements being met (fully, partially or not at all). Modules providing services/resources to other modules implement an algorithm to determine its mode of operation/configuration in accordance with its internal resources (e.g. power, cooling ability), the demands made by other modules and their current status/other possible modes of operation/configurations, and configures itself and/or other modules in accordance with the algorithm. Where various modes of operation are possible, giving flexibility in how the modules are configured, these may be prioritised, e.g. by a user at setup, such that the algorithm can determine the optimum mode given the overall configuration and status of the modules in the chassis. These algorithms operate continually, periodically or in response to events and changes in status in the chassis, so as to be able to automatically adapt in real time to prevailing conditions. Modules may assume master and slave assignments with each other in that they claim or relinquish control in configuring each other as required.

Preferably, these module functions, and interactions and configurations between modules operate without the interface module being involved in controlling the process, and indeed, the interface module may be removed from the enclosure entirely, i.e. where it is field serviceable or hot swappable, without disrupting the functioning of the other modules and their ability to interact.

Figure 13:
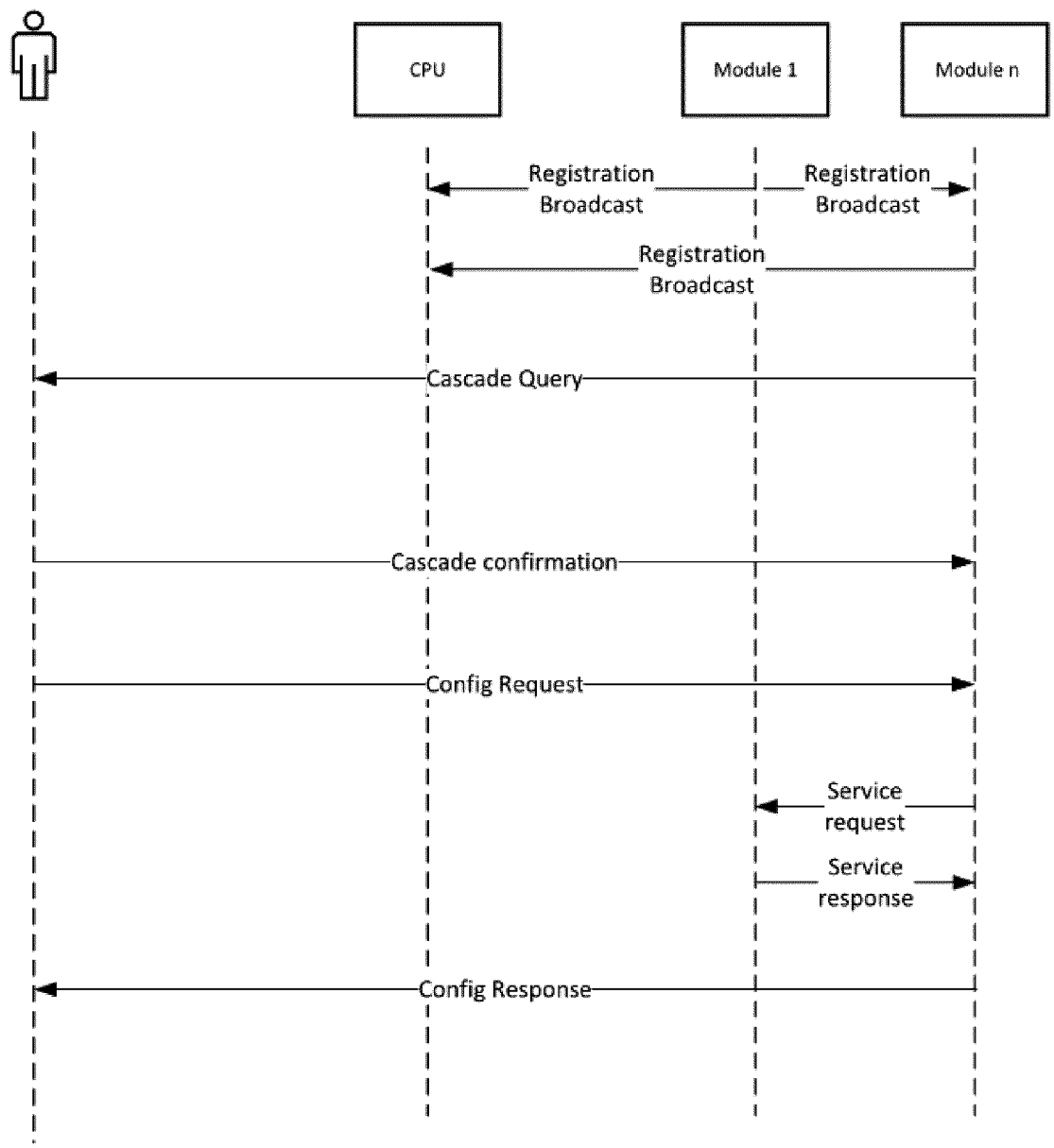
FIG. 13 shows an example of modules cooperating in a cascade arrangement.

In another example, shown by FIG. 13, modules may interact in cascaded operation to provide enhanced range of operation. Once the modules have registered in the system, module 'n' recognizes that module 1 is a similar or related module that it could work cooperatively with and seeks confirmation from the user that this is what they want. The use confirm this, and in response module n takes control over module 1. When the user makes a request from module n, where the requested functionality relies on the cascade of the functionality of the 2 modules, module n then requests the cascaded service from module 1. On successful response from module 1, module n acknowledges the user's request. For example 3 of 4:1 switches may operate together to from a 12:1 switch, with one of them assuming overall control of the other 2 modules. For further example, 2 amplifiers may operate together to provide twice as much gain as a single amplifier.

The modules have a lexicon and protocols enabling them to interact via the messages and request services/configurations from other modules and learn and adapt to their status and configurations. However, the lexicon/protocol need not be the same across all modules, and may evolve over time. For instance, it might be that all modules need the lexicon/protocol for interacting with power supply modules, as power supply is likely a universal requirement across all modules. In contrast, a particular class of module may have the capability to interact with a second class of module to negotiate a particular service, but not at all with a third class of module. Thus, the particular class of module need not know the lexicon and protocols needed to communicate with the third class of module. In time, a fourth class of module may be introduced, or an upgraded module in the second class, which has expanded capabilities reflected in the lexicon/protocol, which the particular module may "learn" by way of a software or firmware update so that it can take advantage of the new capabilities. The second class of module would be entirely unaffected by this. So upgrades and new functionality may be introduced in a subset of modules, with other modules being unaffected, which greatly simplifies the upgrade path.

The concept is based on intelligent interaction between multiple electronic devices/modules forming a system or subsystems of electronics hardware, referred to herein as the "habitat". The control mechanisms within this equipment, firmware or software are regenerative, enabling new functions and new members (e.g. new modules, this could be new functionality, improved or modified functions) to facilitate evolution of the habitat, which adapts and evolves to the environment to optimise functionality and performance. The result is perpetual improvement to performance and extension of the life span.

Figure 5:
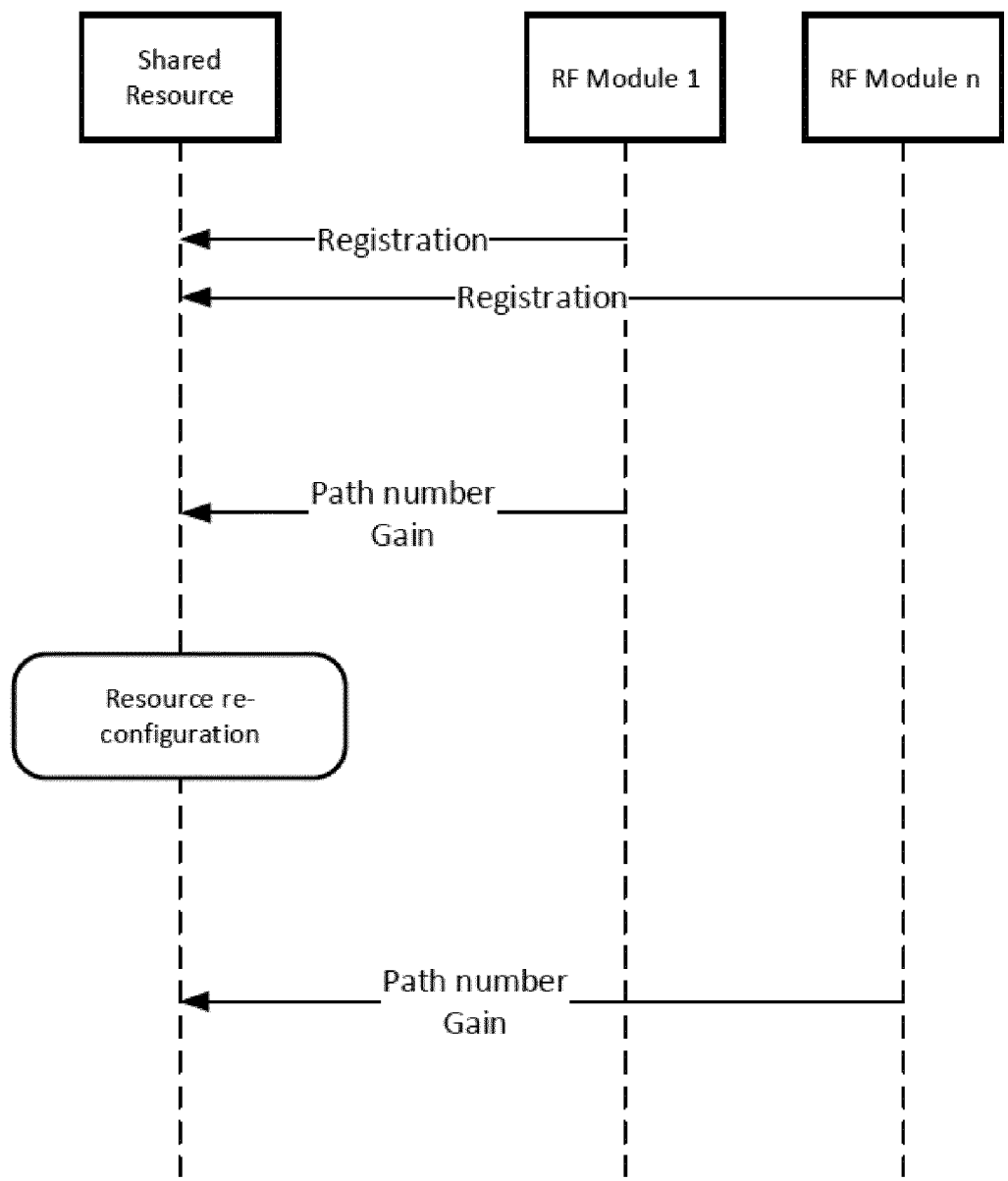
FIG. 5 shows an example of the flow of data when a module accesses a shared resource in the system according to an embodiment of the present invention.

FIG. 5 shows a flow which describes the process where a module requests resources from a shared resource, in this case, a frequency reference module, i.e. an oscillator. As previously described, as each module initialised, it broadcasts a registration message, which is received by the frequency reference. Each module can individually request different performance from this resource. For example a module can request a particular frequency (e.g. 10 MHz). The module may also request a particular path number and or gain to be used in supplying the frequency reference. In a similar way, modules can request cooling from fan modules, or power levels from PSU modules. Thus, modules can request and configure resources from the chassis or from other modules and use these resources to improve performance. If the request cannot be served, the module puts out an error message. The module is intelligent enough to know what it needs to run in each of its modes of operation and to select modes according to available resources to achieve optimum performance.

Knowing the type of module requesting the resource from the registration message, the shared resource can configure itself optimally, for example turning off unused paths, to meet the requests of the requesting modules in the enclosure.

Figure 6:
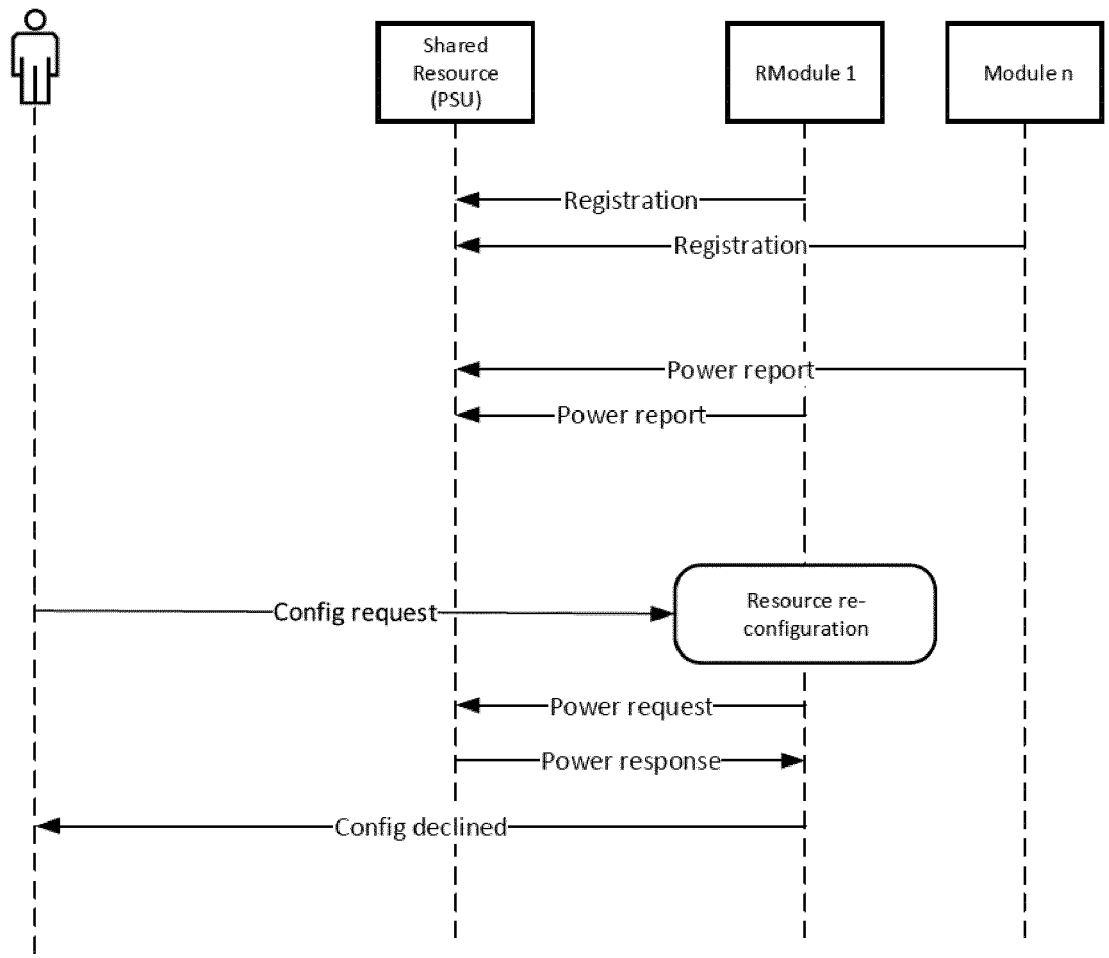
FIG. 6 shows an example of the flow of data when a module requests smart power in the system according to an embodiment of the present invention.

FIG. 6 shows a flow which describes the process where a module reports consumption of a shared resource (in this instance, power). Each PSU 12 is aware from the registration process of the existence of all modules, and their nominal current draw. Each module periodically individually reports its power consumption.

At some later point, the user changes the module configuration (via the HMI as described above) in a way that would result in more power being drawn. The module checks with the PSU 12 that it is able to serve the additional power, and if PSU 12 reports that its available power is insufficient, the module declines the configuration request to the user.

Alternatively, the PSU 12 may be configured to operate in one or more redundancy modes, i.e. power is kept in reserve. In a nonredundant configuration, the power available to the system is the combined power capability of two or more power supplies. The system may power up as many modules as the combined capacity allows. However, if one power supply fails and there is not enough power for all of the previously powered-up modules, the system powers down those modules, based on a user pre-assigned priority—e.g. a module might be assigned as a backup or low priority, perhaps a hot spare becoming a cold spare. In a redundant configuration, the total power drawn from both power supplies is not greater than the capability of one power supply. If one supply malfunctions, the other supply can take over the entire system load. In normal operation, each concurrently provides approximately half of the required power to the system. Thus, a configuration request that requires more power than can be supplied in redundancy mode, may prompt an alert to the user that the system will proceed in a non-redundant mode or give the user the option to proceed or nor. it is also possible that external conditions change the power being drawn from a unit such that the available power from a single PSU is exceeded. In this case, the user is warned that they are running without redundancy.

In other examples, more than one module of a particular type, e.g. power supply modules 12, may be present in the module, in which case they may be configured to collaborate to pool their collective resources in supplying power to modules in the chassis, and may configure themselves and other modules as appropriate.

Figure 7:
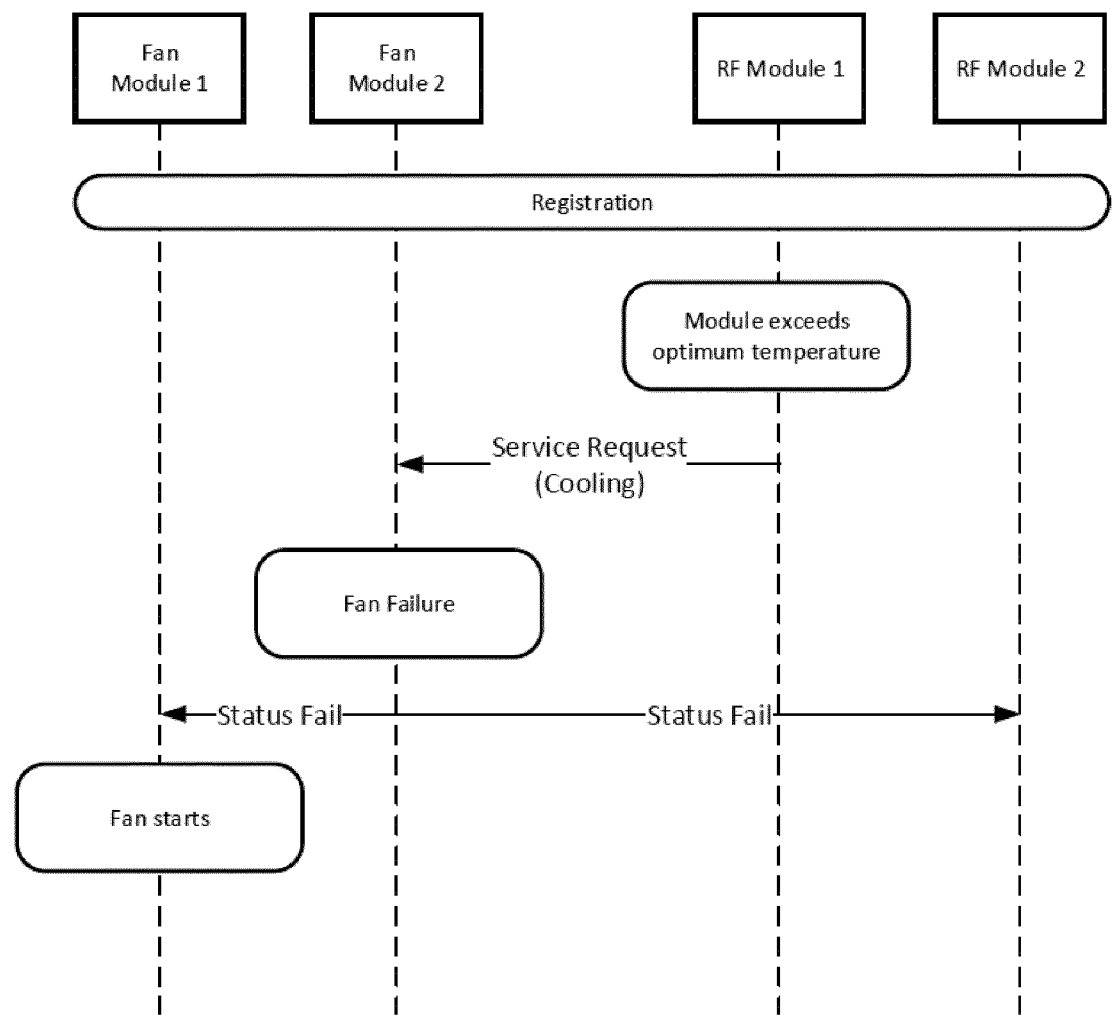
FIG. 7 shows an example of the flow of data when a module requests smart cooling in the system according to an embodiment of the present invention.

FIG. 7 shows an application where multiple fans (in one or more cooling modules) support multiple RF modules. Through the registration process, each module knows the type and location (slot id) of every other module. Each module holds a dynamically generated map of where the other modules are in the chassis. RF module 1 has started to exceed desirable operating temperature. It knows fan module 1 is closest based on the mapping of modules to slots, and requests cooling from it. Thus, optionally a module may configure/start up one module over another of a similar type.

At some later point during the operation of the enclosure, Fan 2 fails (it has sensed that one of its fans has slowed). Fan 2 broadcasts a message to other modules that it has failed. Fan 1, on receiving the failure message starts up, and whilst it may not be the optimal fan, in that it is not closest to the module that requested the cooling, it will improve unit temperature performance until fan 2 is replaced.

In other examples, a fan may be turned on by another module to increase its performance, or reliability. Alternatively the decision can be made to turn off the requesting module, rather than turn on a fan. Complex protocols are implemented to govern the various trade offs to achieve some defined goal.

Figure 8:
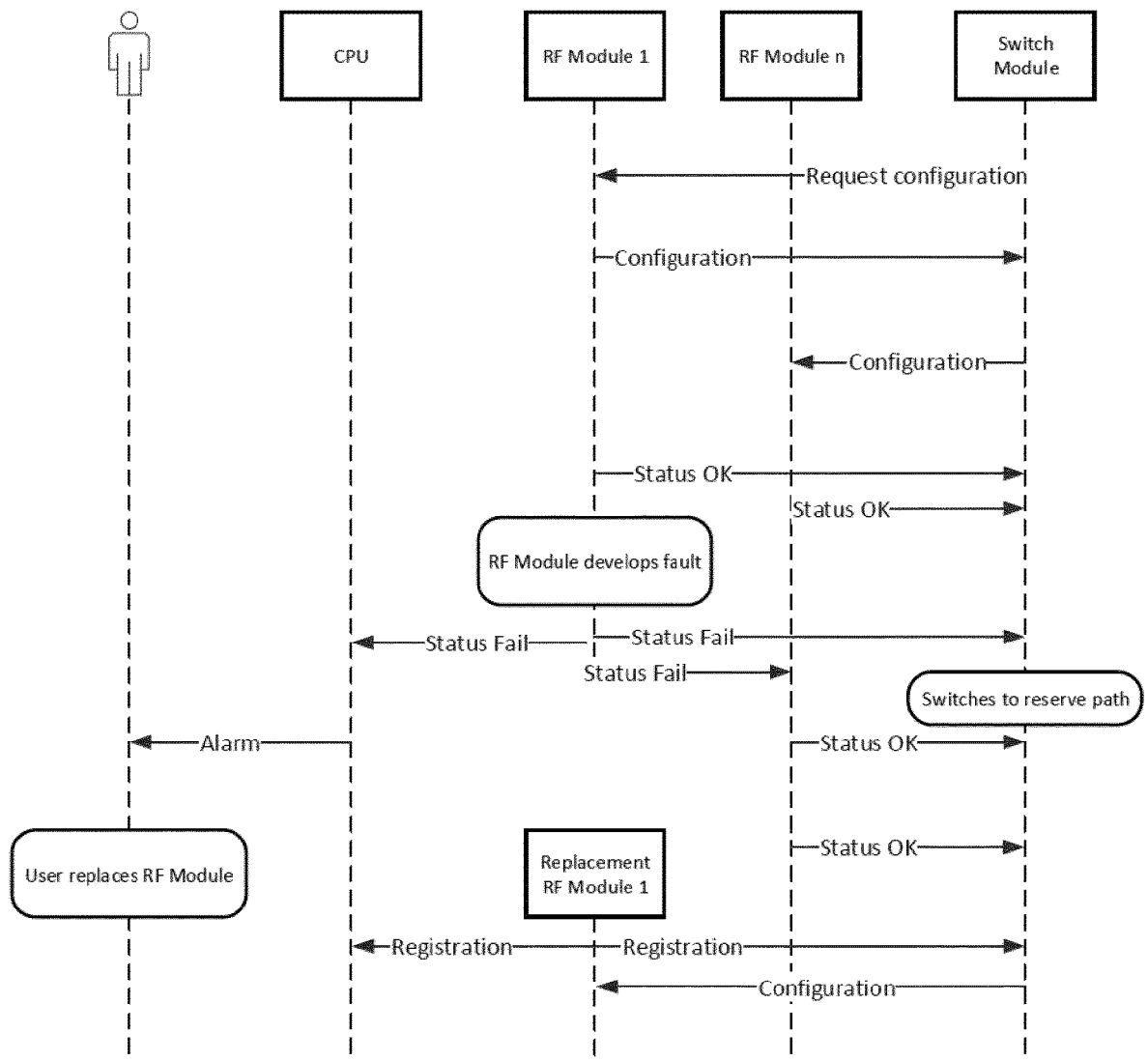
FIG. 8 shows an example of the flow of data when a redundancy switch of a module occurs in the system according to an embodiment of the present invention.

FIG. 8 shows an application where the module is a redundancy switch, which can route an incoming signal through either one of two RF paths. Two RF modules are in the chassis, preconfigured as a primary module and a reserve module. The switch module determines which of the RF paths should be active at a particular time, i.e. the primary module. The switch requests the configuration settings of the primary RF module 1 and receives these in return. The switch then sends the configuration to the reserve module. This assumes the module is operating in "tracking mode". Tracking mode is where the primary module and the standby module are configured to have exactly same setting. This arrangement can allow enable virtually instantaneous switch over. The alternative is the non-tracking mode in which case a short time is taken for the spare module to configure itself to the same settings as the module it is taken over. The latter is more common when the same standby or spare module is used as a common spare for more than one prime modules where the settings of the prime modules differ. An example is a line amplifier. These arrangements are not uncommon in redundancy schemes (e.g. n+m redundancy) where the configuration is dynamic, where one of n spare modules may need to be configured "on the fly" for any one of m primary modules. This may depend on trade off of how modules used vs desired speed of failover.

Another scheme of redundancy is cold redundancy where the spare module is not powered up. The dormant spare is switched on only if the need arises. The disadvantage here is the warm-up time which could be as long as a minute, on the other hand the dormant module remains unused prolonging its life expectation much beyond the option of having it hot (powered) spare.

The RF modules periodically send their status to the switch. This might be in the form of a "heartbeat", the absence of which indicates to the switch that the RF module has failed. If the status indicates that RF module 1 has developed a fault or failed, the switch in response enables the reserve path to the RF module 2. RF module 2 has been configured with suitable settings already by the switch and can seamlessly assume the function of the failed module, or RF module 2 can be configured at that point. The interface module also detects from the broadcast message that RF module 1 has failed, and causes a suitable alert to be sent to the user via the HMI that a failure has occurred.

RF module 2 assuming the function of the failed module may in turn lead to RF module 2 requesting services from other modules to permit it to do so. For instance, in response to being made active, the RF module 2 may request the frequency reference module to supply it with a particular reference frequency as derived from the configuration settings supplied by the switch. Thus, there may be a sequence of modules configuring other modules.

At some future point, the user replaces the failed RF module 1. Replacement is hot swap. That is, it takes pace whilst the chassis and all its modules remains powered up and operational, without any interruption to its live traffic through the modules. The replacement module broadcasts its presence in the chassis as before, alerting the other modules to its presence. In response, the switch downloads the parameters of the failed RF module to its replacement and switches the path back to the this module. RF module 2 resumes its role as a reserve module.

Figure 9:
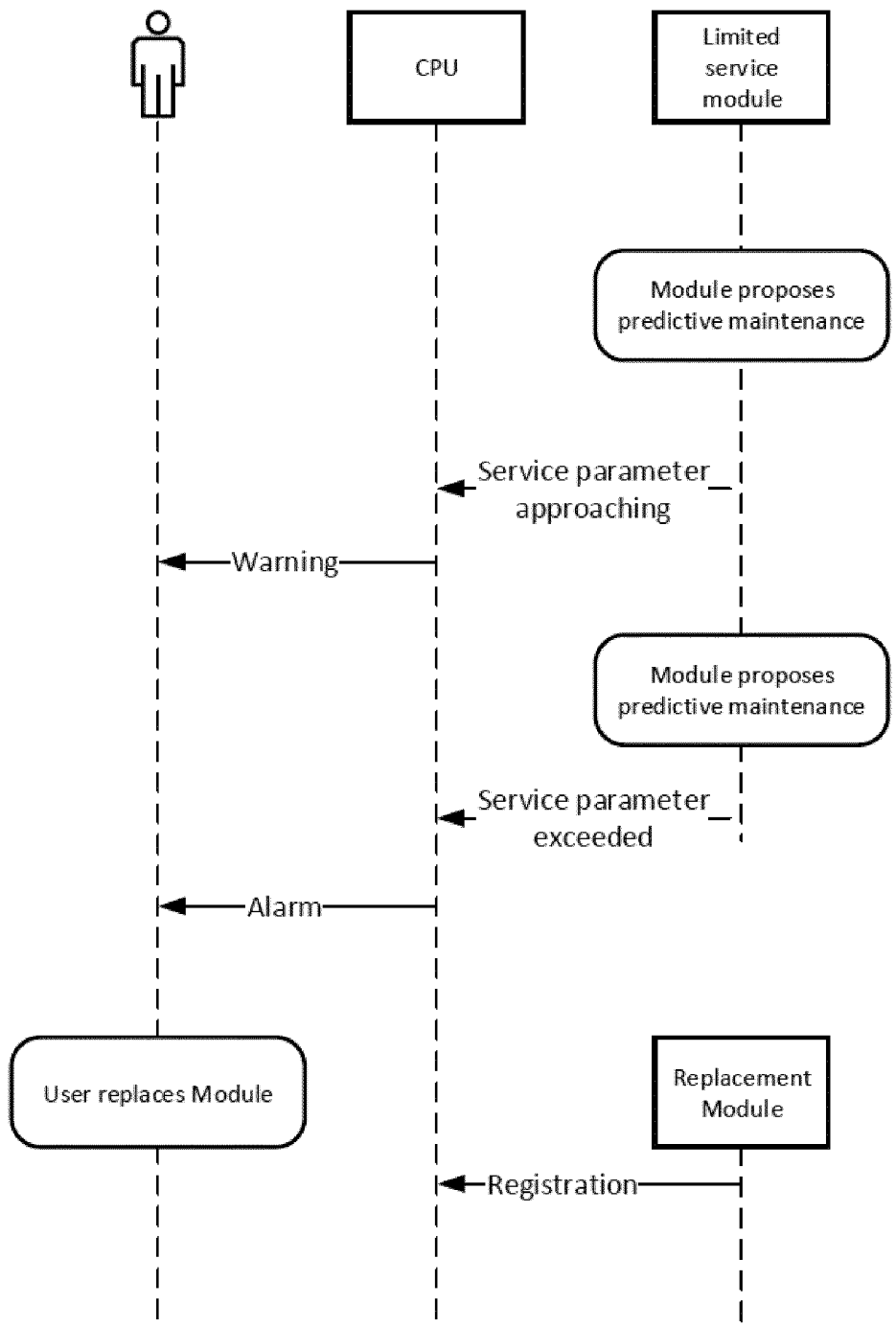
FIG. 9 shows an example of the flow of data when performing predictive replacement of a module in the system according to an embodiment of the present invention.

FIG. 9 shows an example of a flow that describes how a smart module can propose preventative maintenance. The module identifies that replacement is due soon, identified by a "water mark", i.e. when some measured or calculated value approaches the water mark. This decision is algorithm based. The algorithm may be simple such as age, running hours, or number of switching operations, or amount of power supplied. The algorithm may be more complex, and use parameters such as humidity and temperature exposure, in combination with simpler parameters to create a service parameter value to compare against the watermark.

When it has been determined that the service parameter is approaching the water mark, a warning is issued to the user. Optionally, the CPU/interface module may populate an email to allow the replacement part to be ordered with minimal user intervention. This can be blocked by the system administrator if desired. Assuming no action has been taken by the user, when the service parameter exceeds the watermark, the module escalates the predictive maintenance request to an alarm that the module is overdue for replacement. Once replacement has been made, the new module registers itself with the system.

The system may also extend to chassis to chassis communication or rack to rack communication, allowing modules to request services from modules in other chassis which have been connected together. Returning to FIG. 1B each system/chassis 1 broadcasts its capabilities to others via the LAN. Thus, an chassis with a touchscreen/display may provide control of a system without local user interface 11 and/or touchscreen display. A chassis 1 whose local interface 11 has failed may request that another chassis with a working local interface control it. A chassis 1 with a failed module may suggest to the user another chassis in the system from which a spare could temporarily be obtained. A failure on a module on one chassis may cause another chassis to change its performance, e.g. gain compensation or routing.

Embodiments of the present invention have been described with particular reference to the examples illustrated. However, it will be appreciated that variations and modifications may be made to the examples described within the scope of the present claims.

The invention claimed is:

1. A modular electronic apparatus for distribution of RF communication signals, comprising:
- a chassis arranged to removably receive plural modules, at least some of which are arranged to receive and process RF communication signals;
- a common bus for modules to communicate with each other and with the chassis; and
- plural modules received in the chassis,
- wherein the chassis has a processing unit arranged to provide a user interface for the apparatus,
- wherein when a module is received in the chassis, it is arranged to broadcast a message over the common bus indicating its presence in the chassis and its type and capabilities in processing RF communications signals including services providable to other modules in the chassis, wherein the processing unit is arranged to register the module in response to receiving the message over the common bus and has no prior knowledge of a module type and its capabilities, wherein at least one other module is arranged to adapt its behavior in response to receiving the message over the common bus,
- wherein a module inserted into the chassis and registered is arranged to provide a sub-user interface defining which information relating to the inserted module and controls for configuring the inserted module are to be displayed, and
- wherein the processing unit is arranged to request and receive the sub-user interface relating to the inserted and registered module over the common bus and to render the sub-user interface into the user interface such that a user is presented with information relating to the inserted and registered module and controls for configuring the inserted and registered module via the user interface and wherein in response to the user selecting one of the controls the processing unit communicates with the module over the common bus to cause a selected configuration of the module.

2. The apparatus of claim 1, wherein when a module is received in a slot in the chassis, and registers with the processing unit, the received module is shown and becomes selectable in the user interface generated by the processing unit, and when the user selects the received module in the user interface, the processing unit requests the sub-user interface from the received module and renders it in the user interface.

3. The apparatus of claim 1, wherein the user interface comprises webpages, the processing unit provides a web-server arranged to serve at least one webpage associated with the chassis, and comprises a module web proxy server to request a respective website from modules registered with the processing unit to provide sub-user interfaces for those registered modules.

4. The apparatus of claim 3, wherein the processing unit is configured such that the processing unit renders the respective website from the modules in the user interface.

5. The apparatus of claim 4, wherein the processing unit is configured such that the processing unit renders the respective website from the modules in the user interface as received without modification.

6. The apparatus of claim 1, wherein at least one module has configurable capabilities as one or more of: a power supply, a cooling module, and a reference frequency generator.

7. The apparatus of claim 1, wherein at least one module has configurable capabilities regarding at least one of: an amplifier, am attenuator, an RF filter, a signal generator/source, switches, switch matrices, frequency converters, RF over Fiber modules, couplers and RF monitors, splitters and combiners, or equalizers and slope compensation modules.

* * * * *